US012113936B1

United States Patent
Ross et al.

(10) Patent No.: US 12,113,936 B1
(45) Date of Patent: *Oct. 8, 2024

(54) SYSTEM AND METHOD FOR MANAGING ROUTING OF CUSTOMER CALLS

(71) Applicant: Massachusetts Mutual Life Insurance Company, Springfield, MA (US)

(72) Inventors: Gareth Ross, Amherst, MA (US); Andrew Reagan, Springfield, MA (US); Randall Schwager, Englewood, CO (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,450

(22) Filed: Aug. 23, 2023

Related U.S. Application Data

(63) Continuation of application No. 17/986,687, filed on Nov. 14, 2022, now Pat. No. 11,743,389, which is a
(Continued)

(51) Int. Cl.
*H04M 3/51* (2006.01)
*G06N 5/04* (2023.01)
(Continued)

(52) U.S. Cl.
CPC ............ *H04M 3/5235* (2013.01); *G06N 5/04* (2013.01); *G06N 20/00* (2019.01);
(Continued)

(58) Field of Classification Search
CPC ...... G06N 5/04; G06N 20/00; G06Q 30/0202; H04M 3/51; H04M 3/5191; H04M 3/523; H04M 3/5235; H04M 3/5238
(Continued)

(56) References Cited

U.S. PATENT DOCUMENTS

| 5,519,773 A | 5/1996 | Dumas et al. |
| 6,185,558 B1 | 2/2001 | Bowman et al. |

(Continued)

FOREIGN PATENT DOCUMENTS

| EP | 2 109 302 B1 | 10/2009 |
| WO | WO-2007/112411 A2 | 10/2007 |

(Continued)

OTHER PUBLICATIONS

Bernier, "Interactive Voice Response", Genesys, retrieved Oct. 3, 2017 from URL: http://www.genesys.com/solutions/customer-engagement/inbound/intelligent-voice-response (3 pages).
(Continued)

*Primary Examiner* — Harry S Hong
(74) *Attorney, Agent, or Firm* — Foley & Lardner LLP

(57) ABSTRACT

A call management system of a call center identifies an inbound caller based upon computer analysis of customer identifiers, which may include at least two of customer name, street address, and zip code. Approximate string matching analysis matches n-grams generated from strings within customer identifiers, with n-grams generated from customer identification fields while searching one or more databases. Approximate string matching can incorporate a closeness metric based on Jaccard distance, and a Gaussian mixture model of best matches. In one embodiment, a Polymr search engine analyzes customer identifiers of inbound callers to retrieve customer data, such as customer demographic data, matched to the customer identifiers. In another embodiment, the Polymr search engine analyzes customer identifiers of inbound callers to identify repeat callers and retrieve previously collected customer data. Retrieved customer data is used in predictive modeling and scoring value of the inbound call, and in routing the scored inbound call.

20 Claims, 10 Drawing Sheets

Related U.S. Application Data continuation of application No. 16/228,305, filed on Dec. 20, 2018, now Pat. No. 11,509,771, which is a continuation-in-part of application No. 14/576,993, filed on Dec. 19, 2014, now abandoned.

(60) Provisional application No. 61/922,139, filed on Dec. 31, 2013, provisional application No. 61/921,760, filed on Dec. 30, 2013.

(51) Int. Cl.
*G06N 20/00* (2019.01)
*G06Q 30/0202* (2023.01)
*H04M 3/523* (2006.01)

(52) U.S. Cl.
CPC ...... *G06Q 30/0202* (2013.01); *H04M 3/5191* (2013.01); *H04M 3/5238* (2013.01)

(58) Field of Classification Search
USPC .............. 379/265.01, 265.02, 265.09, 265.1
See application file for complete search history.

(56) References Cited

U.S. PATENT DOCUMENTS

| | | | |
|---|---|---|---|
| 6,236,977 B1 | 5/2001 | Verba et al. | |
| 6,611,590 B1 | 8/2003 | Lu et al. | |
| 6,862,574 B1 | 3/2005 | Srikant et al. | |
| 6,879,683 B1 | 4/2005 | Fain et al. | |
| 6,970,554 B1 | 11/2005 | Peterson et al. | |
| 6,975,720 B1 | 12/2005 | Crook | |
| 7,023,979 B1 | 4/2006 | Wu et al. | |
| 7,035,811 B2 | 4/2006 | Gorenstein | |
| 7,047,206 B1 | 5/2006 | Schultze | |
| 7,085,740 B1 | 8/2006 | Meyers | |
| 7,228,284 B1 | 6/2007 | Vaillancourt et al. | |
| 7,275,083 B1 | 9/2007 | Seibel et al. | |
| 7,340,410 B1 | 3/2008 | Vaillancourt et al. | |
| 7,580,870 B1 | 8/2009 | Chang | |
| 8,005,767 B1 | 8/2011 | Cassella | |
| 8,355,934 B2 | 1/2013 | Virdhagriswaran | |
| 8,379,830 B1 | 2/2013 | Naik et al. | |
| 8,515,736 B1 | 8/2013 | Duta | |
| 8,548,843 B2 | 10/2013 | Folk et al. | |
| 8,571,951 B2 | 10/2013 | Diana et al. | |
| 8,577,014 B2 | 11/2013 | Brandt et al. | |
| 8,582,750 B2 | 11/2013 | Lee et al. | |
| 8,781,092 B2 | 7/2014 | Noble, Jr. | |
| 8,805,734 B2 | 8/2014 | Diana et al. | |
| 9,160,851 B2 | 10/2015 | Kugler et al. | |
| 9,263,038 B2 | 2/2016 | Flaks et al. | |
| 9,582,786 B2 | 2/2017 | Gubin et al. | |
| 9,635,181 B1 | 4/2017 | McGann et al. | |
| 9,680,996 B2 | 6/2017 | Kumar et al. | |
| 9,911,131 B1 | 3/2018 | Ross et al. | |
| 9,916,538 B2 | 3/2018 | Zadeh et al. | |
| 10,242,068 B1 | 3/2019 | Ross et al. | |
| 10,257,357 B1 | 4/2019 | Merritt | |
| 10,395,184 B1* | 8/2019 | Merritt | G06Q 30/0601 |
| 11,509,771 B1 | 11/2022 | Ross et al. | |
| 11,743,389 B1* | 8/2023 | Ross | G06N 5/04 |
| | | | 379/265.09 |
| 2002/0035504 A1 | 3/2002 | Dver et al. | |
| 2002/0082892 A1 | 6/2002 | Raffel et al. | |
| 2002/0128885 A1 | 9/2002 | Evans | |
| 2002/0138492 A1 | 9/2002 | Kil | |
| 2004/0081311 A1 | 4/2004 | Thompson | |
| 2004/0143473 A1 | 7/2004 | Tivey et al. | |
| 2004/0143476 A1 | 7/2004 | Kapadia et al. | |
| 2004/0143482 A1 | 7/2004 | Tivey et al. |
| 2004/0143483 A1 | 7/2004 | Tivey et al. |
| 2004/0143484 A1 | 7/2004 | Kapadia et al. |
| 2005/0125334 A1 | 6/2005 | Masella et al. |
| 2005/0195966 A1 | 9/2005 | Adar et al. |
| 2006/0041500 A1 | 2/2006 | Diana et al. |
| 2006/0155642 A1 | 7/2006 | Pettersen |
| 2006/0200360 A1 | 9/2006 | Razletovskiy |
| 2006/0229896 A1 | 10/2006 | Rosen et al. |
| 2006/0265259 A1 | 11/2006 | Diana et al. |
| 2007/0027746 A1 | 2/2007 | Grabowich |
| 2007/0094181 A1 | 4/2007 | Tayebnejad et al. |
| 2007/0136164 A1 | 6/2007 | Roti et al. |
| 2007/0174108 A1 | 7/2007 | Monster |
| 2007/0239769 A1 | 10/2007 | Fazal et al. |
| 2008/0120129 A1 | 5/2008 | Seubert et al. |
| 2008/0162258 A1 | 7/2008 | Kala et al. |
| 2008/0184270 A1 | 7/2008 | Cole et al. |
| 2008/0201204 A1 | 8/2008 | Rose et al. |
| 2008/0201205 A1 | 8/2008 | Rose et al. |
| 2008/0294501 A1 | 11/2008 | Rennich |
| 2009/0144070 A1 | 6/2009 | Psota et al. |
| 2009/0190744 A1 | 7/2009 | Xie et al. |
| 2009/0190745 A1 | 7/2009 | Xie et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2010/0030578 A1 | 2/2010 | Siddique et al. |
| 2010/0054453 A1 | 3/2010 | Stewart |
| 2010/0114573 A1 | 5/2010 | Huang et al. |
| 2010/0306249 A1 | 12/2010 | Hill et al. |
| 2011/0153449 A1 | 6/2011 | Hite |
| 2011/0196776 A1 | 8/2011 | Rash et al. |
| 2011/0225082 A1 | 9/2011 | Diana et al. |
| 2011/0246409 A1 | 10/2011 | Mitra |
| 2011/0258016 A1 | 10/2011 | Barak et al. |
| 2011/0258067 A1 | 10/2011 | Rowell |
| 2011/0307257 A1 | 12/2011 | Pereg et al. |
| 2011/0314690 A1 | 12/2011 | Stanish et al. |
| 2012/0051537 A1 | 3/2012 | Chishti et al. |
| 2012/0053986 A1 | 3/2012 | Cardno et al. |
| 2012/0066065 A1 | 3/2012 | Switzer |
| 2012/0072232 A1 | 3/2012 | Frankham et al. |
| 2012/0166445 A1 | 6/2012 | Chakrabarti et al. |
| 2012/0203584 A1 | 8/2012 | Mishor et al. |
| 2012/0278091 A1 | 11/2012 | Yaseen et al. |
| 2013/0006916 A1 | 1/2013 | McBride et al. |
| 2013/0013601 A1 | 1/2013 | Kabiljo et al. |
| 2013/0054480 A1 | 2/2013 | Ross et al. |
| 2013/0085805 A1 | 4/2013 | Krusar |
| 2013/0215116 A1 | 8/2013 | Siddique et al. |
| 2013/0218634 A1 | 8/2013 | Hills et al. |
| 2013/0236002 A1 | 9/2013 | Jennings et al. |
| 2014/0058831 A1 | 2/2014 | Duva et al. |
| 2014/0133646 A1 | 5/2014 | Ma et al. |
| 2014/0149178 A1 | 5/2014 | Hedges |
| 2014/0149339 A1 | 5/2014 | Title et al. |
| 2014/0153703 A1 | 6/2014 | Desai et al. |
| 2014/0201126 A1 | 7/2014 | Zadeh et al. |
| 2014/0229406 A1 | 8/2014 | Puzis et al. |
| 2014/0279722 A1 | 9/2014 | Singh et al. |
| 2014/0289005 A1 | 9/2014 | Laing et al. |
| 2014/0324529 A1 | 10/2014 | Bliss |
| 2015/0046219 A1 | 2/2015 | Shavlik |
| 2015/0154524 A1 | 6/2015 | Borodow et al. |
| 2015/0332372 A1 | 11/2015 | Hariri et al. |
| 2016/0071117 A1 | 3/2016 | Duncan |
| 2016/0203498 A1 | 7/2016 | Das et al. |
| 2016/0337795 A1 | 11/2016 | Nachman et al. |
| 2016/0342903 A1 | 11/2016 | Shumpert |
| 2017/0013131 A1 | 1/2017 | Craib |
| 2017/0124581 A1 | 5/2017 | Wilson et al. |
| 2017/0223190 A1 | 8/2017 | Mandel et al. |

(56) References Cited

U.S. PATENT DOCUMENTS

2017/0243137 A1    8/2017   Mandel et al.
2019/0132451 A1    5/2019   Kannan

FOREIGN PATENT DOCUMENTS

WO    WO-2009/065052 A1    5/2009
WO    WO-2017/200558 A1    11/2017

OTHER PUBLICATIONS

Bernier, "Speech & Text Analytics", Genesys, retrieved Oct. 3, 2017 from URL: http://genesis.com/solutions/employee-engagement/workforce-optimization/workforce-planning/speech-text-analytics (4 pages).

Cody et al., "The integration of business intelligence and knowledge management", IBM Systems Journal, vol. 41, No. 4, Jul. 12, 2002, pp. 697-713, retrieved from URL: https://pdfs.semanticscholar.org/3803/109409dd7822c6007d5c76808b8c28698e2cd.pdf (17 pages).

Costa, Sara, "Call Flow", Talkdesk Support, Jan. 18, 2018, retrieved May 11, 2018 from URL: https://support.talkdesk.com/hc/en-US/articles/206196766-Call-Flow (6 pages).

Final Office Action on U.S. Appl. No. 14/576,640 dated May 3, 2018. 29 pages.

Final Office Action on U.S. Appl. No. 14/576,686 dated Jan. 18, 2018. 22 pages.

Final Office Action on U.S. Appl. No. 14/576,774 dated Feb. 9, 2018. 11 pages.

Final Office Action on U.S. Appl. No. 14/576,993 dated Apr. 6, 2017. 32 pages.

Final Office Action on U.S. Appl. No. 14/576,993 dated Feb. 7, 2019. 35 pages.

Final Office Action on U.S. Appl. No. 14/576,993 dated Jan. 9, 2020. 35 pages.

Final Office Action on U.S. Appl. No. 14/576,993 dated May 3, 2018. 52 pages.

Final Office Action on U.S. Appl. No. 16/125,503 dated Mar. 16, 2021. 11 pages.

Final Office Action on U.S. Appl. No. 16/219,892 dated Jun. 17, 2021. 36 pages.

Final Office Action on U.S. Appl. No. 16/506,954 dated Apr. 27, 2020. 23 pages.

Final Office Action on U.S. Appl. No. 16/219,892 dated Dec. 6, 2022 (38 pages).

Florez-Lopez et al., "Marketing Segmentation Through Machine Learning Models: An Approach Based on Customer Relationship Management and Customer Profitability Accounting", Social Science Computer Review, Oct. 8, 2008, pp. 1-22, DOI: 10.1177/0894439308321592, retrieved from URL: https://pdfs.semanticscholar.org/ef05/502e936a94cafa0037c764bfb2212f385d97.pdf (22 pages).

Gayle, Sanford, "The Marriage of Market Basket Analysis to Predictive Modeling", 2000, pp. 1-6, retrieved from URL: http://ai.stanford.edu/~ronnyk/WEBKDD2000/papers/gayle.pdf (6 pages).

Golbeck, Jennifer Ann, "Computing and applying trust in web-based social networks", Dissertation, 2005 (199 pages).

Guestrin, Carlos, "Unsupervised learning or Clustering-K-means Gaussian mixture models", Apr. 4, 2007, retrieved from URL: http://www.cs.cmu.edu/-guestrin/Class/10701-S07/Slides/clustering.pdf (67 pages).

Jutla et al., "Enabling and Measuring Electronic Customer Relationship Management Readiness," Proceedings of the 34th Hawaii International Conference on System Sciences—2001; <http://www.computer.org/csdl/proceedings/nicss/2001 /0981 /07 /09817023.pdf>, Aug. 7, 2002, (10 pages).

Kim et al., "Customer Targeting: A Neural Network Approach Guided by Genetic Algorithms", Feb. 1, 2005, retrieved from URL: http://citeseerx.ist.psu.edu/viewdoc/download?doi=10.1.1.2.697&rep=rep1 &type=pdf (31 pages).

Lin et al., "Combining ranking concept and social network analysis to detect collusive groups in online auctions", Expert Systems with Applications, vol. 30, Issue 10, pp. 9079-9086 (8 pages).

Motta et al., "Forecasting in multi-skill call centers: A multi-agent multi-service (MAMS) approach: research in progress", 2013 Fifth International Conference on Service Science and Innovation (ICSSI), Oct. 24, 2013, retrieved from URL: http://ieeexplore.IEEE.org/abstract/document/6599389/ (7 pages).

Non-Final Office Action on U.S. Appl. No. 14/576,640 dated Sep. 21, 2017, 16 pages.

Non-Final Office Action on U.S. Appl. No. 14/576,686 dated Jun. 15, 2018, 21 pages.

Non-Final Office Action on U.S. Appl. No. 14/576,686 dated May 18, 2017, 19 pages.

Non-Final Office Action on U.S. Appl. No. 14/576,774 dated Jun. 29, 2017, 17 pages.

Non-Final Office Action on U.S. Appl. No. 14/576,993 dated Aug. 22, 2016, 14 pages.

Non-Final Office Action on U.S. Appl. No. 14/576,993 dated Jun. 27, 2019. 35 pages.

Non-Final Office Action on U.S. Appl. No. 14/576,993 dated Oct. 3, 2017. 34 pages.

Non-Final Office Action on U.S. Appl. No. 14/576,993 dated Oct. 3, 2018, 50 pages.

Non-Final Office Action on U.S. Appl. No. 16/125,503 dated Aug. 6, 2020. 37 pages.

Non-Final Office Action on U.S. Appl. No. 16/167,212 dated Nov. 30, 2018, 11 pages.

Non-Final Office Action on U.S. Appl. No. 16/219,892 dated Apr. 26, 2022 (42 oages).

Non-Final Office Action on U.S. Appl. No. 16/219,892 dated Dec. 23, 2020. 32 pages.

Non-Final Office Action on U.S. Appl. No. 16/506,954 dated Sep. 19, 2019. 18 pages.

Non-Final Office Action on U.S. Appl. No. 16/219,892 dated Mar. 29, 2023 (38 pages).

Non-Final Office Action on U.S. Appl. No. 16/228,305 dated Apr. 7, 2022 (8 pages).

Notice of Allowance on U.S. Appl. No. 14/576,774 dated Aug. 15, 2018, 11 pages.

Notice of Allowance on U.S. Appl. No. 16/125,503 dated Jun. 16, 2021. 10 pages.

Notice of Allowance on U.S. Appl. No. 16/167,212 dated Apr. 19, 2019. 10 pages.

Notice of Allowance on U.S. Appl. No. 17/986,687 dated Apr. 12, 2023 (8 pages).

Notice of Allowance on U.S. Appl. No. 16/228,305 dated Jul. 19, 2022 (5 pages).

Shen et al., Forecasting Time Series of Inhomogenous Poisson Processes with Application to Call Center Workforce Management, The Annals of Applied Statistics, <https://www.unc.edu/-haipeng/publication/poissonSVD.pdf>, Jul. 25, 2008, (25 pages).

Stepanov et al., "Automatic Summarization of Call-center Conversations", Conference: IEEE Automatic Speech Recognition and Understanding Workshop (ASRU 2015), Dec. 2015, retrieved from URL: https://www.researchgate.net/publication/282976793_Automatic_Summarization_of_Call-center_Conversations (3 pages).

US Notice of Allowance on U.S. Appl. No. 16/506,954 dated Aug. 6, 2020 (9 pages).

US Notice of Allowance on U.S. Appl. No. 16/506,954 dated Sep. 22, 2020 (3 pages).

Wang et al., "Recommending trusted online auction sellers using social network analysis." Expert Systems with Applications 34.3, 2008, pp. 1666-1679 (14 pages).

Yankov et al., "Evaluation of Explore-Exploit Policies in Multi-result Ranking Systems", Apr. 28, 2015, retrieved from URL: https://arxiv.org/pdf/1504.07662.pdf (9 pages).

Yu, W., "Agent-based demand forecasting for supply chain management", UMI No. 3089526, available from ProQuest Dissertations and Theses Professional (305323160), Retrieved from https://dialog.proquest.com/professional/docview/305323160?accountid=131444, May 10, 2003, 161 pages.

(56) References Cited

OTHER PUBLICATIONS

Sourish Dasgupta, Satish Bhat and Yugyung Lee, Semantic Taxonomical Clustering for Service Category Learning, arXiv: 1303.5926, 2013 (Year: 2013).

* cited by examiner

FIG. 7

SYSTEM AND METHOD FOR MANAGING ROUTING OF CUSTOMER CALLS

CROSS-REFERENCE TO RELATED APPLICATIONS

This application is a continuation of U.S. Ser. No. 17/986,687, entitled "SYSTEM AND METHOD FOR MANAGING ROUTING OF CUSTOMER CALLS," filed Nov. 14, 2022, which is a continuation of U.S. Ser. No. 16/228,305, entitled "SYSTEM AND METHOD FOR MANAGING ROUTING OF CUSTOMER CALLS," filed Dec. 20, 2018, which is a continuation-in-part of U.S. Ser. No. 14/576,993, entitled "METHOD FOR AUCTIONING LEADS TO AGENTS," filed Dec. 19, 2014, which claims benefit of U.S. Provisional App. No. 61/921,760, filed Dec. 30, 2013, and Provisional App. No. 61/922,139, filed Dec. 31, 2013, all of which are incorporated by reference in their entirety.

This application is related to U.S. Ser. No. 16/110,872, filed Aug. 23, 2018, which claims benefit of U.S. Provisional App. No. 62/551,690, filed Aug. 29, 2017, U.S. Provisional App. No. 62/648,330, filed Mar. 26, 2018, U.S. Provisional App. No. 62/648,325, filed Mar. 26, 2018, and U.S. Provisional App. No. 62/687,130, filed Jun. 19, 2018, all of which are incorporated by reference in their entirety.

TECHNICAL FIELD

The present disclosure relates generally to customer contact centers and their operation and, more particularly, to a system and method for managing routing of customer calls.

BACKGROUND

Customer contact centers provide an important interface for customers/partners of an organization to contact the organization. The contact can be for a request for a product or service, for trouble reporting, service request, etc. The contact mechanism in a conventional call center is via a telephone, but it could be via a number of other electronic channels, including email, online chat, etc.

The contact center consists of a number of human agents, each assigned to a telecommunication device, such as a phone or a computer, for conducting email or Internet chat sessions, that is connected to a central switch. Using these devices, the agents generally provide sales, customer service, or technical support to the customers or prospective customers of a contact center, or of a contact center's clients. Conventionally, a contact center operation includes a switch system that connects callers to agents. In an inbound contact center, these switches route inbound callers to a particular agent in a contact center, or, if multiple contact centers are deployed, to a particular contact center for further routing. When a call is received at a contact center (which can be physically distributed, e.g., the agents may or may not be in a single physical location), if a call is not answered immediately, the switch will typically place the caller on hold and then route the caller to the next agent that becomes available. This is sometimes referred to as placing the caller in a call queue. In conventional methods of routing inbound callers to agents, high business value calls can be subjected to a long wait while low business value calls are often answered more promptly, possibly causing dissatisfaction on the part of the high business value caller.

In many call centers, the agents answering calls are organized into a plurality of groups or teams, with each group having primary responsibility of the calls in one or more call queues. Different agent groups often have responsibility for different goals or functions of the call center, such as generating customer leads, closing sales with prospects, and servicing existing customers. Routing an inbound caller to an appropriate group or team of the call center to address the needs of that caller can be a burdensome, time-consuming process.

It is known to use automatic call routing processes to identify high business value inbound callers for prioritized treatment, and to control routing of callers to different agents or agent groups of a call center. However, real-time data processing techniques for automatic call routing can experience difficulty in reliably identifying inbound callers (customers). Errors in customer identification may cause errors in retrieving data for such customers from data sources such as customer demographic databases. Additionally, errors in customer identification, such as associating a lead with customer data and business value analyses compiled by the call center for that lead during a previous inbound call, can cause inefficiencies in routing repeat callers.

Additionally, there is a need to improve traditional methods of routing callers, such as "round-robin" caller routing, to improve allocation of limited call center resources to high business value inbound callers, and to efficiently route inbound callers to appropriate agents or agent groups of a call center. There is a need for a system and method for reliably identifying inbound callers at a call center during a time period in which inbound callers are awaiting connection to an agent, as part of automatic call routing methods. There is a related need for efficiently retrieving information concerning inbound callers, and for associating repeat inbound callers with information previously collected by the call center, as part of automatic call routing methods.

SUMMARY

The methods and systems described herein attempt to address the deficiencies of the conventional systems to more efficiently analyze and route an identified inbound caller to a user using a predictive machine learning model, and to update a graphical user interface to display a value prediction score and demographic information associated with the identified inbound caller. The methods and systems employ computer-implemented dynamic techniques for routing inbound callers identified as particular individuals based upon computer analysis of customer identifiers.

In an embodiment, customer identifiers include at least two of customer name, street address, and zip code. In an embodiment, elements of the customer name used as customer identifiers include one or more of first name, last name, and middle name. In an embodiment, the street address used as a customer identifier consists of a normalized postal address. In some embodiments, customer identifiers include one or both of phone number and email address of the customer.

Computer analysis of customer identifiers collected for inbound callers uses statistical natural language processing techniques that model text strings associated with the customer identifiers. The computer analysis of customer identifiers uses an n-gram model for statistical modeling of natural language sequences associated with customer identifiers.

In various embodiments, the computer analysis of customer identifiers uses an n-gram model that effects approximate string matching analysis. The approximate string matching analysis effects pattern matching of n-grams generated from character strings within customer identifiers collected from an inbound callers with n-grams generated from customer identification fields in one or more databases searched during the computer automated call routing process.

Approximate string matching analysis determines a metric representative of closeness of the n-grams generated from character strings within customer identifiers to n-grams generated from the customer identification fields in one or more databases searched during the computer automated call routing process, and compares this closeness to a threshold. In an embodiment, the closeness metric used in approximate string matching is based on Jaccard distance.

In various embodiments, the approximate string matching analysis includes a probabilistic model for representing the presence of subpopulations within a set of approximate pattern matches. In an embodiment, the approximate string matching analysis incorporates a multi-component Gaussian mixture model.

In various embodiments, an automatic call routing system incorporates a "Polymr" search engine that embodies n-gram modeling techniques for indexing, and for searching, customer data including customer identifiers. ("Polymr" is the Applicant's name for a lightweight, extensible search engine developed by Applicant). In various embodiments, the Polymr search engine analyzes customer identifiers of inbound callers to retrieve customer data, such as customer demographic data, matched to the customer identifiers. In various embodiments, the Polymr search engine analyzes customer identifiers of inbound callers in real time to identify repeat callers and to retrieve customer data and customer value analyses previously collected for the identified customer.

The Polymr search engine embodies n-gram modeling techniques for indexing customer data. In various embodiments, the Polymr search engine is used for continuous training of predictive models used in automatic call routing. In various embodiments, a computer automated call routing process uses one or more customer databases previously indexed by the Polymr search engine and predictive models previously trained using the Polymr search engine, in automatically scoring and/or routing of inbound callers.

Methods and systems described herein automatically assign an inbound call from a customer to a routing assignment, wherein the queue call queue position is based on predicted value of the inbound telephone call. One or more predictive models of the call management system determine a value prediction signal for the identified customer. Based on the value prediction signal determined, the predictive models score or classify the identified customer for automated call routing. Value-based scoring of identified customers can be used in prioritized routing of inbound callers, and in routing inbound callers to appropriate agents or agent groups of the call center.

In one embodiment, a processor-based method for managing customer calls within a call center comprises, upon receiving a customer call within a call center from an inbound caller, collecting, by the processor, a plurality of customer identifiers associated with the inbound caller, and generating a customer index file by applying an n-gram model to extract a set of n-grams from strings representing the plurality of customer identifiers; querying, by the processor, records in a customer demographic database to determine which of the records in the customer demographic database match the customer index file and to retrieve from the customer demographic database the records that match the customer index file, wherein the customer demographic database was previously indexed by applying the n-gram model to extract n-grams from strings representing customer identification fields in a training database, and wherein the querying step applies approximate string matching analysis to compare the n-grams extracted from the strings representing the customer identification fields with the set of n-grams extracted from the strings representing the plurality of customer identifiers; executing a predictive model to determine a value prediction signal in real time by applying a logistic regression model in conjunction with a tree-based model to the records retrieved from the customer demographic database; scoring the customer call based on the value prediction signal determined by the predictive model; and displaying, by a display device in operative communication with the processor, a graphical user interface including scoring of the customer call based on the value prediction signal, and demographic information associated with the inbound caller included in one or more of the records retrieved from the customer demographic database that match the customer index file.

In another embodiment, a system for managing customer calls within a call center, comprises an inbound telephone call-receiving device for receiving a customer call to the call center from an inbound caller; non-transitory, machine-readable memory that stores a customer demographic database, wherein the customer demographic database was previously indexed by applying an n-gram model to extract n-grams from strings representing customer identification fields in a training database; a display device; and a processor in operative communication with the display device and configured to execute an inbound routing management module and a predictive modeling module configured to store a predictive model of customer value, wherein the predictive model comprises a logistic regression model operating in conjunction with a first tree-based model, wherein the processor in communication with the non-transitory machine-readable memory executes a set of instructions instructing the processor to: upon receiving the customer call at the inbound telephone call-receiving device, collect a plurality of customer identifiers associated with the inbound caller, and generate a customer index file by applying the n-gram model to extract a set of n-grams from strings representing the plurality of customer identifiers; query records in the customer demographic database to determine which of the records match the customer index file and to retrieve from the customer demographic database the records that match the customer index file, wherein the searching step applies approximate string matching analysis to compare the n-grams extracted from the strings representing the customer identification fields with the set of n-grams extracted from the strings representing the plurality of customer identifiers; determine a value prediction signal for the inbound caller in real time via applying the predictive model to the records retrieved from the customer demographic database; score the customer call based on the value prediction signal determined by applying the predictive model; and display, by the display device, a graphical user interface including the score of the customer call based on the value prediction signal, and demographic information associated with the inbound caller included in one or more of the records retrieved from the customer demographic database that match the customer index file.

In yet another embodiment, a processor-based method for managing customer calls within a call center, comprises, upon receiving a customer call within a call center from an inbound caller, collecting, by the processor, a plurality of customer identifiers associated with the inbound caller, and generating a customer index file by applying an n-gram model to extract a set of n-grams from strings representing the plurality of customer identifiers; querying, by the processor, records in a lead database to determine whether one of the records in the lead database matches the customer index file; wherein each of the records in the lead database comprises customer demographic data, customer valuation data, and customer identification fields for a lead; wherein the lead database was previously indexed by applying the n-gram model to the customer identification fields for the lead to extract n-grams from strings representing the customer identification fields; and wherein the determining applies approximate string matching analysis to compare the set of n-grams extracted from the strings representing the plurality of customer identifiers with the n-grams extracted from the strings representing the customer identification fields; in the event of determining that one of the records in the lead database matches the customer index file, scoring, by the processor, the customer call based on the customer demographic data and the customer valuation data in the one of the records; in the event of determining that none of the records in the lead database matches the customer index file, executing, by the processor, a predictive model comprising a logistic regression model operating in conjunction with a first tree-based model to determine a value prediction signal in real time by applying the predictive models to the records for the inbound caller retrieved from a customer demographic database, and scoring the customer call based on the value prediction signal determined by the predictive model; and routing the customer call to a routing assignment based on the scoring the customer call, wherein the routing assignment comprises one or more of routing to a priority routing assignment, routing to a subordinate routing assignment, routing to a selected user group, routing to a user requested by the inbound caller, routing to a user group requested by the inbound caller, and routing to a general call queue.

Other objects, features, and advantages of the present disclosure will become apparent with reference to the drawings and detailed description of the illustrative embodiments that follow.

BRIEF DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

FIG. 7 is a schematic diagram of customer database event tables for customer groups prospect, lead, new business, and sale, and of tables for attribution between events, in accordance with an embodiment.

DETAILED DESCRIPTION

Figure 1:
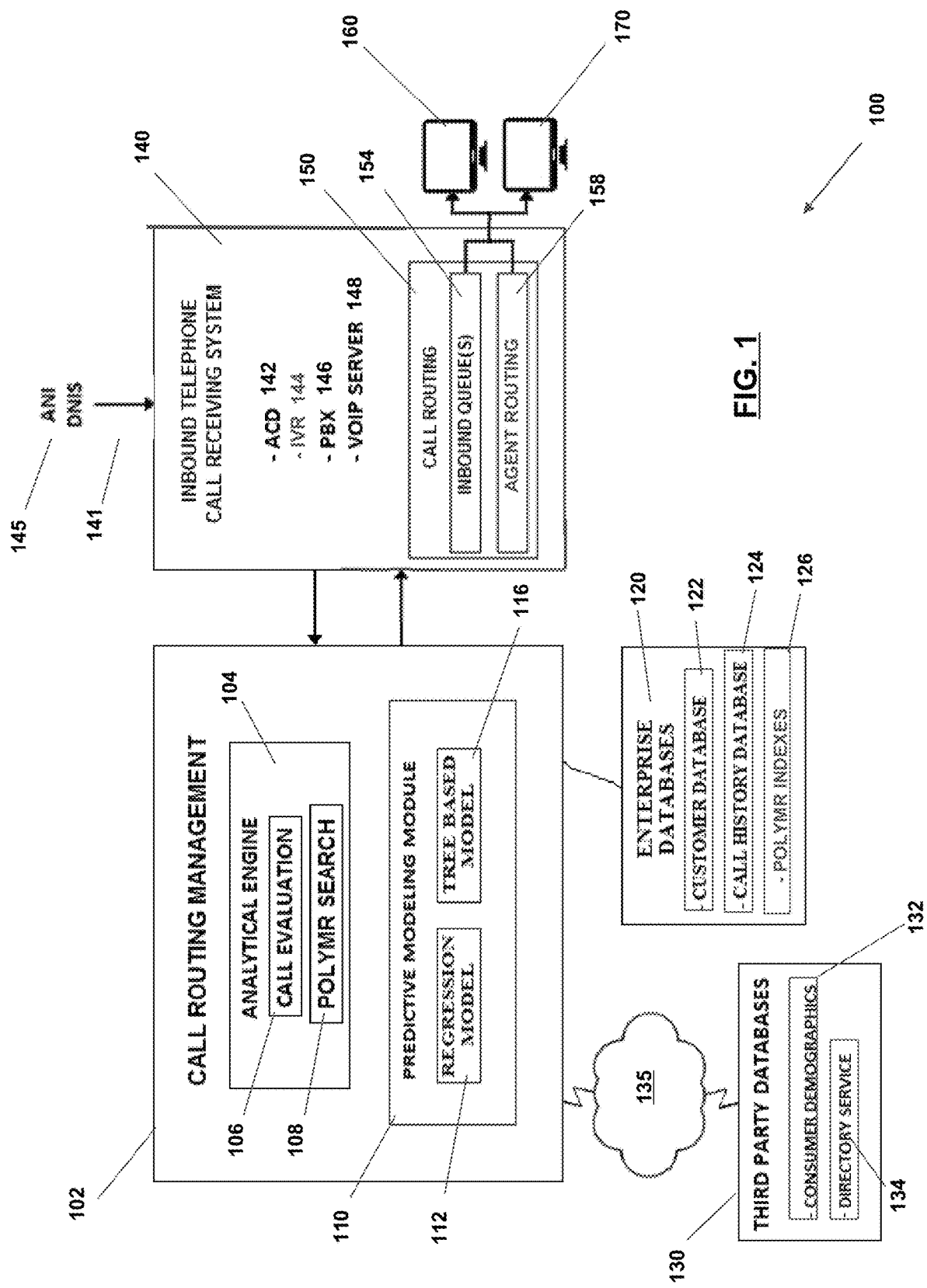
FIG. 1 is a system architecture for a customer management system of a call center, in accordance with an embodiment of the invention.

In the following detailed description, reference is made to the accompanying drawings, which depict non-limiting, illustrative embodiments of the present disclosure. Other embodiments may be utilized and logical variations, e.g., structural and/or mechanical, may be implemented without departing from the scope of the present disclosure. To avoid unnecessary detail, certain information, items, or details known to those skilled in the art may be omitted from the following.

Contact routing at an inbound contact center can be structured to connect callers to agents (also referred to as advisors and users) that have been idle for the longest period of time. In the case of an inbound caller where only one agent may be available, that agent is generally selected for the caller without further analysis. In another example of routing an inbound call, if there are eight agents at a contact center, and seven are occupied with callers, the switch will generally route the inbound caller to the one agent that is available. If all eight agents are occupied with contacts, the switch will typically put the caller on hold and then route the caller to the next agent that becomes available. More generally, the contact center will set up a queue of inbound callers and preferentially route the longest-waiting callers to the agents that become available over time. A pattern of routing callers to either the first available agent or the longest-waiting agent is sometimes referred to as "round-robin" caller routing.

In general, when a caller is placed in a call queue, the caller's queue position is dependent upon the receipt time of the call at the vendor location. No consideration is given to the identity of the caller or the potential value of the call. While this is a democratic way to handle inbound calls, it may not be good for business. For instance, a large number of low business value calls may be in a queue when a high business value call is received. As a result, the high business value call may be subjected to a long wait while the low business value calls are answered—with attendant dissatisfaction on the part of the high business value caller. When call centers have an inadequate number of skilled agents to handle all callers, such as at times of peak call volume, challenges of effectively handling high-value callers can be especially severe. The method and system of the present disclosure are intended to alleviate these problems.

Call center operations include various types of call queues. For example, an inbound caller may be put on hold and placed on an answering queue or hold list, to be routed to a live agent when the caller has moved up to the first position in the call queue. In another example, if call centers are unable to route inbound callers to a live agent within a reasonable period of time, an inbound caller may be placed on a call-back list, to receive a call-back from a live agent when the caller has moved up to the first position on the call-back list.

In some call centers, an inbound caller is routed to one of a plurality of groups of call center agents (e.g., two groups), respectively associated with a plurality of call queues. Each group of agents is assigned to implement one or more predetermined function or goal of the call center; in the present disclosure a given goal or function of the call center is called a "customer care interaction." Customer care interactions may be broad in scope, such as generating customer leads, closing sales of products of a sponsoring enterprise of the call center, and customer service interactions with existing customers or purchasers (individuals who previously purchased a product of the sponsoring enterprise). Customer care interactions also can be more specific in scope, such as promoting a given product as part of a marketing campaign.

Call centers also can implement automatic call routing procedures to route repeat callers to a particular agent or group of call center agents, in the case of callers that request connection that agent or agent group. For example, the call center may institute procedures to route a repeat caller that was previously identified by the call center as a high business value lead to a particular agent or agent group requested by that caller. As another example, for existing customers of an enterprise associated with the call center, such as a purchaser of a product of that enterprise, customer relationship management (CRM) procedures for the enterprise may preferentially route that caller to particular agent that has been assigned to the caller's account.

The method and system of the present disclosure effects computer automated techniques for routing inbound callers that are identified as particular individuals, also herein called identified customers, based upon computer analysis of customer identifiers collected for the inbound caller. In an embodiment, customer identifiers include at least two of customer name, street address, and zip code. In some embodiments, customer identifiers include one or both of phone number, and email address, of the customer. In an embodiment, the customer name consists of one or more of first name, last name, and middle name. In an embodiment, the street address used as a customer identifier consists of a normalized postal address.

In an embodiment, computer analysis of customer identifiers collected for inbound callers uses statistical natural language processing techniques that model text strings associated with customer identifiers.

In an embodiment, the computer analysis of customer identifiers is an n-gram model that effects approximate string matching analysis. The approximate string matching analysis effects pattern matching of n-grams generated from character strings within customer identifiers collected from an inbound callers with n-grams generated from customer identification fields in one or more databases searched in real time during the automated call routing process. In an embodiment, the approximate string matching analysis determines a metric of closeness of the n-grams generated from character strings within customer identifiers to the n-grams generated from the customer identification fields in one or more databases searched during the computer automated call routing process, and compares this closeness to a threshold. In an embodiment, the closeness metric used in approximate string matching is based on Jaccard distance.

In an embodiment, the approximate string matching analysis includes a probabilistic model for representing the presence of subpopulations within a set of approximate pattern matches. In an embodiment, the approximate string matching analysis incorporates a multi-component Gaussian mixture model.

In an embodiment, an automatic call routing system incorporates a Polymr search engine that embodies n-gram modeling techniques for indexing, and for searching, customer data including customer identifiers. In an embodiment, the Polymr search engine analyzes customer identifiers of inbound callers in real time to retrieve customer data, such as customer demographic data, associated with an identified caller. In an embodiment, the Polymr search engine analyzes customer identifiers of inbound callers in real time and compares these customer identifiers with a lead database to identify repeat callers and to retrieve customer data and customer value analyses previously collected for an identified lead.

In an embodiment, a Polymr search engine embodies n-gram modeling techniques for continuously indexing customer data used in automatic call routing. In an embodiment, the Polymr search engine is used for continuous training of predictive models used in automatic call routing. In an embodiment, a computer automated call routing process uses one or more customer databases previously indexed by the Polymr search engine and a predictive model previously trained using the poly search engine, in automatically scoring and/or routing of inbound callers.

Methods and systems described herein can automatically assign an inbound call from a customer to a routing assignment, wherein the queue call queue position is based on predicted value of the inbound telephone call. A predictive model of the call management system determines a value prediction signal for the identified customer. Based on the value prediction signal determined, the predictive model scores or classifies the identified customer for automated call routing. Value-based scoring of identified customers can be used in prioritized routing of inbound callers, and in routing inbound callers to appropriate agents or agent groups of the call center.

In various embodiments, call queue assignments may include prioritized routing. As used in the present disclosure, prioritized routing may include a prioritized routing assignment for high-scoring callers, and a subordinate routing assignment for lower-scoring callers. Generally speaking, a prioritized routing assignment is more favorable than a subordinate routing assignment. In an embodiment, a prioritized routing assignment is an advanced queue position, and a subordinate routing assignment is a less advanced queue position. In an embodiment, a prioritized routing assignment routes the caller to a queue for immediate call-back, and a subordinate routing assignment routes the caller to a queue for deferred call-back. In an embodiment, a prioritized routing assignment routes the caller to a group of higher-skilled agents, and a subordinate routing assignment routes the caller to a group of lower-skilled agents. In another embodiment, a prioritized routing assignment routes the caller to a particular agent requested by the caller, and a subordinate routing assignment does not route the caller to a particular agent.

In an embodiment, a customer database tracks individuals who are customers of a sponsoring organization or client of the call center, or other enterprise served by the call center, associating these individuals with one or more groups representing general types of customers. In an embodiment, these customer groups include prospects, leads, new business and purchasers (also herein called sales). Data from the customer database can be used in selecting a group of agents from a plurality of groups of agents of the call center in routing an inbound caller that has been identified as a given customer in the customer database.

In an embodiment, a poly search engine that implements n-gram modeling creates one or more of a poly index of leads and a poly index of existing customers from the customer database. In various embodiments, the automatic call routing processor verifies that an inbound caller corresponds to a lead or existing customer who had previously called the call center. In an embodiment, the verification matches customer identifiers of the inbound caller to one or more Polymr indexes of leads and existing customers who had previously called the call center. In an embodiment, the automatic call routing processor expedites scoring and routing of the inbound caller following this verification.

Methods and systems described herein can employ a predictive model relating to offering for sale one or more products offered or supplied by a sponsoring organization of an inbound contact center. In various embodiments, the products offered or supplied by the sponsoring organization require payments by the customer for a period following closing the sale, such as premiums to maintain in force an insurance policy or other financial product, or installment plans for product purchase. In various embodiments, the predictive model incorporates information on a minimum period of time of customer payments required to achieve a beneficial transaction for the sponsoring organization, wherein failure of the customer to make payments over at least this minimum time period is sometimes referred to herein as "lapse." A presale predictive model forecasts customer behavior to improve the probability of closing a sale of an offered product to an inbound customer, and to reduce the probability that the customer will lapse in payment for the purchased product.

In an embodiment, a predictive model classifies inbound callers into two or more value groups. In an embodiment, two value groups are modeled to model higher predicted value and lower predicted value, respectively, to the sponsoring organization. In various embodiments, this classification governs value-based routing of inbound telephone calls for response by agents, to allocate limited resources of the inbound contact center. An individual employed by the contact center to interact with callers is referred to herein as an "agent."

In the present disclosure, an inbound contact center is sometimes called simply a contact center or a call center. The individuals that interact with the contact center using a telecommunication device are referred to herein as callers and, alternatively, are referred to as inbound callers, as customers, or as any of the general types of customer. As used in the present disclosure, a "customer" may be an existing customer or a prospective customer of the sponsoring organization, including any of the general groups of customers tracked in the customer database. In an embodiment, a customer is associated with the one or more of the following groups: prospects, leads, new business and sales (also herein called purchasers). A given individual may be associated with multiple such groups over different stages of customer acquisition. For example, a purchaser may have previously been one or more of a prospect, a lead or a new business applicant.

In an embodiment of the customer groups in the customer database, "Prospects" are individuals that have contacted the enterprise. Inbound prospects may or may not be customers in the customer databases. In an embodiment, if an inbound caller is not identified with an individual in the customer database, the database opens a new record for that caller in the prospects group. "Leads" are individuals who have expressed interest in one or more products of the enterprise; as used herein products may include goods or services sold by the enterprise, or a combination of these. A lead may have previously been a prospect, or may not have been a prospect (e.g., an individual that searches for products or services of the enterprise online). "New Business" (also herein called new business applicants) identifies applicants to purchase one or more products of the enterprise, where such purchase requires underwriting. These applicants may have been prospects, leads or both. "Purchasers" (also herein called "sales") generally are individuals that own a product of the enterprise. Purchasers may have been prospects, leads, new business applicants, or any combination of these groups.

In certain contexts, the present disclosure uses the term "lead" more generally, in which a lead can include any of the above-described types of customer for which a record has been opened in a lead database, such as an internal lead database of a sponsoring organization of the call center. In these contexts, a lead is an individual tracked in the lead database.

A pre-sale prediction model can incorporate information on a minimum period of time of customer payments required to achieve a beneficial transaction for the sponsoring organization, and uses this information in determining conditions for "lapse." In an embodiment, pre-sale predictive models of the present disclosure incorporate a pre-determined period of time of payments following the sale of the product to define lapse. In certain embodiments, a sale of an insurance policy or other financial product requires only that the prospect complete an application to purchase the policy, sometimes called guaranteed acceptance. When selling via guaranteed acceptance, lapse rates for sold policies tend to be higher.

A key metric for value-based classification of a customer who has purchased a product is called a "lifetime value" of the product sale to that customer. In various embodiments, lifetime value includes the sum of all associated costs over product lifetime, netted against revenue for the product sale. In an exemplary embodiment involving sale of an insurance policy, associated costs include various sales acquisition costs, including marketing costs distributed across inbound calls, cost of operating the inbound contact center distributed across inbound calls, and commission at the time of sale. In this example, additional associated costs include cost of providing the insurance policy, and claims or death benefits. The lifetime value for the product (insurance policy) sold to that customer is the net value of all premiums paid, over the sum of all such associated costs during that policy life.

Methods and systems described herein can identify lapse (e.g., for a given product or class of products) with a pre-determined period of time following sale of the product, and define lapse as failure of the customer to make payments for the product over at least this period of time. In various embodiments, this predetermined period of time is based upon modeling a minimum period of time for achieving a positive lifetime value for the product sale. This model compares total payments received with associated costs over different product lifetimes to determine the predetermined period. In one embodiment, product lifetime represents a period of time in which the customer has continued to make purchase payments for the product, such as premiums or installment payments. In another embodiment, lifetime value is measured during the full term or life of an insurance policy or other financial instrument until all claims and death benefits have been paid, even if all premiums or other customer payments had been paid prior to this time.

FIG. 1 shows a system architecture for a customer management system 100 of a contact center, also herein called a call center, according to an illustrative embodiment. In the present disclosure, the call center is sometimes called an inbound call center or inbound contact center, referring to its primary function of receiving inbound customer calls. However, it should be understood that communications of the inbound call center on occasion may include outbound calls, or call-backs, in response to inbound customer calls. Customer management system 100 includes an inbound routing management system 102, also called an inbound call management system. The inbound routing management system 102 may be hosted on one or more computers (or servers), and the at least one computer may include or be communicatively coupled to one or more databases. Inbound routing management system 102 manages assignment of inbound telephone calls for response by agents of the call center. Inbound routing management system 102 includes an analytical engine 104 containing a call evaluation sub-module 106, and a Polymr search module 108. Predictive modeling module 110 includes a regression model 112 and a tree-based model 116. The analytical engine 104 with modules 106 and 108, and the predictive modeling module 110 with models 112 and 116, may be executed by a processor of the inbound routing management system 102.

Inbound call management system 102 is interfaced with one or more enterprise databases 120, which are internal databases of the inbound contact center. Enterprise databases 120 include customer database 122, which tracks individuals who are customers of the sponsoring organization of the call center or other client enterprise, and call history database 124. The enterprise databases 120 also include Polymr indexes 126. In an embodiment, analytical engine 104 interacts with external services, applications, and databases, such as third-party databases 130, through one or more application programmable interfaces, an RSS feed, or some other structured format, via communication network 135. In the embodiment of FIG. 1, inbound routing management system 102 retrieves data from one or more third-party databases 130, including a consumer demographic database 132 and a directory service database 134.

Predictive modeling module 110 models behaviors of customers such as likelihood that a caller will purchase a product offered by the call center and likelihood that the caller will lapse in payments for a purchased product. The predictive modeling module analyzes each inbound customer call using data associated with customer identifiers for the inbound caller. Thus, customer identifiers may be obtained from various sources by the call evaluation sub-module 106. The customer identifiers are processed by Polymr search module 108 to confirm that an inbound caller is an identified customer, whether as a new caller to the call center or as a previous caller, and may be used in searching one or more databases within Polymr indexes 126 to collect additional data (e.g., customer demographic data) for the identified customer. Input data used in predictive modeling includes data retrieved from Polymr indexes 126 and may include data from other internal databases 120. Additionally, input data used in predictive modeling may include data from third-party databases 130. This input data also may include data derived from the retrieved data that has been transformed by analytical engine 104 in order to facilitate predictive modeling, as described herein.

Databases 120 are organized collections of data, stored in non-transitory, machine-readable storage. In an embodiment, the databases may execute or may be managed by database management systems (DBMS), which may be computer software applications that interact with users, other applications, and the database itself, to capture (e.g., store data, update data) and analyze data (e.g., query data, execute data analysis algorithms). In some cases, the DBMS may execute or facilitate the definition, creation, querying, updating and/or administration of databases. The databases may conform to a well-known structural representational model, such as relational databases, object-oriented databases and network databases. Exemplary database management systems include MySQL, PostgreSQL, SQLite, Microsoft SQL Server, Microsoft Access, Oracle, SAP, dBASE, FoxPro, IBM DB2, LibreOffice Base, and FileMaker Pro. In an embodiment. Polymr indexes 126 are LevelDB backend databases that store entries lexicographically sorted by keys. LevelDB is an on-disk key-value storage library, described at leveldb.org/.

Analytical engine 104 can be executed by a server, one or more server computers, authorized client computing devices, smartphones, desktop computers, laptop computers, tablet computers, PDAs and other types of processor-controlled devices that receive, process and/or transmit digital data. Analytical engine 104 can be implemented using a single-processor system including one processor, or a multi-processor system including any number of suitable processors that may be employed to provide for parallel and/or sequential execution of one or more portions of the techniques described herein. Analytical engine 104 performs these operations as a result of central processing unit executing software instructions contained within a computer-readable medium, such as within memory. In one embodiment, the software instructions of the system are read into memory associated with the analytical engine 104 from another memory location, such as from storage device, or from another computing device via communication interface. In this embodiment, the software instructions contained within memory instruct the analytical engine 104 to perform processes described below. Alternatively, hardwired circuitry may be used in place of or in combination with software instructions to implement the processes described herein. Thus, implementations described herein are not limited to any specific combinations of hardware circuitry and software.

Predictive modeling module 110 generates a value prediction signal representative of the likelihood that the customer will accept an offer to purchase a product. In various embodiments, the value prediction center may also represent one or more of the likelihood that the customer will lapse in payments for a purchased product, and the likelihood that the customer will accept an offer to purchase the product and will not lapse in payments for the purchased product. In certain embodiments, the predictive modeling module can predict more than one of these customer behaviors. For example, the predictive model may first determine the likelihood that the customer will accept an offer to purchase a product, followed by determining the likelihood that the customer will lapse in payments for a purchased product, in order to determine a value prediction signal. Based on this value prediction signal, the analytical module, in conjunction with the predictive modeling module, scores inbound callers for value-based routing. In an embodiment, this scoring includes classification of each customer call into one of two, or more, value groups.

Depending on the group of agents selected and the value group determined for each customer call, analytical engine 104 directs routing of the customer call to call routing module 150 to await connection to an agent of the call center. In an embodiment, call routing module 150 includes a component 154 that routes the inbound call to one of multiple call queues of the call center. In FIG. 1, two groups of call center agents with respective call queues-first agent group/call queue 160 and second agent group/call queue 170—are shown. In addition, call routing module 150 includes a component 158 that routes the inbound call to a particular agent, such as an agent requested by the inbound caller. Routing inbound calls based on analysis of customer data for identified customers and based on modeling call value represents a significant improvement over traditional methods of routing callers, such as "round-robin" caller routing.

Inbound call management system 102 interfaces with an inbound call-receiving system 140. In customer management system 100, inbound call management system 102 and call-receiving system 140 may be integrated in a single computing platform. Alternatively, these systems may be based on separate computing platforms. In certain embodiments, the computing platform(s) are interfaced with computer-telephone integration ("CTI") middleware. In an embodiment, inbound call-receiving system 140 includes a telephony device that accepts inbound telephone calls through a telephony interface 141, such as conventional T1 or fiber interfaces. Inbound call-receiving system 140 accepts inbound telephone calls through interface 141 and obtains caller information associated with the inbound calls, such as Automatic Number Identification ("ANI") and Dialed Number Identification Service ("DNIS") information 145. ANI is a signaling system feature in which a series of digits, either analog or digital, are included in the call identifying the source telephone number of the calling device. DNIS is a telephone function that sends the dialed telephone number to an answering service. The DNIS need not be a telephone number associated with any physical location.

Inbound call-receiving system 140 may include an Automatic Call Distributor ("ACD") system 142; a Voice Response Unit ("VRU") system 144; a private branch exchange ("PBX") switch 146; a Voice over Internet Protocol ("VOIP") server 148; or any combination of such devices. In an embodiment, intrasite telephony access within the call center may be managed by a private branch exchange (PBX) switch 146. In an embodiment, PBX switch 146 operates in coordination with ACD 142 to distribute inbound calls to customer service stations of locally-networked call center agents. In further embodiments, inbound inquiries may include email or instant messages that provide inquiry information based on login ID, email address, IP or instant message address. In such an embodiment, the call center can gather additional information by an automated email or instant message survey response, which can be used to request various types of customer identifier data.

In various embodiments, the inbound call-receiving system 140 collects customer identifiers for an inbound caller, and transmits these customer identifiers to call evaluation sub-module 106. In an embodiment, the customer identifiers include at least two of name, street address, and zip codes of the inbound caller; also referred to herein as customer name, customer address and customer zip code. In an embodiment, the customer name includes at least two of first name, last name, and middle name. In an embodiment, the customer address is a normalized street address. In an embodiment, the normalized street address is a normalized postal address, such as a normalized postal address supplied by SmartyStreets, a Provo Utah provider of postal address validation services. In an embodiment, the customer street address is the Address1 field in SmartyStreets™ street address data.

Customer identifiers for an inbound caller are used by inbound routing management system 102 to retrieve or identify additional data associated with that customer. In an embodiment, Polymr module 108 uses natural language processing techniques based upon n-gram models for statistical modeling of character sequences associated with customer identifiers of the inbound caller. These techniques generate index files based upon the customer identifiers, and retrieve additional data from external and/or internal databases concerning the inbound callers by approximate string matching of the index files with customer identification fields in internal databases 120 and/or external databases.

In an embodiment, a source of customer identifiers is Voice Response Unit ("VRU") system 144, which collects the customer identifiers through automated interaction with the customer. For instance, VRU 144 may query an inbound caller to collect customer identifiers information when ANI is not operative, e.g., when caller-ID is blocked. In an embodiment, a source of customer identifiers is third-party directory service 134. In an embodiment, directory service 134 provides call evaluation sub-module 106 with additional caller identification information, such as name and street address, for inbound callers that are initially identified only by a telephone number.

Inbound telephone calls received through interface 141 are distributed to call queue(s) routing module 150 for response by agents 160, 170 operating telephony devices. In an embodiment, agents are associated with a sponsoring organization that sells or supplies products with the assistance of the call center. In an embodiment, call center agents generate leads by qualifying prospects and by promoting products of the sponsoring organization. In an embodiment, the enterprise generates sales of one or more products through advertisements that give a phone number to prospective customers, and the prospective customers call into the call center using this phone number. In an exemplary embodiment, the agents in first group 160 implement the customer care interaction of offering an advertised product to a prospective customer (lead or new business applicant), while the agents in second group 170 implement the customer care interaction of customer service to existing customers. In another embodiment, a third group of agents (not shown) implements the customer care interaction of screening prospects to generate qualified leads.

In an embodiment, a sponsoring organization for customer management system 100 is an insurance company or other financial services company, and the agents may include insurance agents. In some cases, an insurance agent may be associated with only a single insurance provider (sometimes referred to as a "captive" insurance agent). In other cases, an "independent" insurance agent may be associated with several different insurance providers. In an embodiment of the system 100, the agents in the first group 160 are licensed to sell insurance. In some cases, the producers may be licensed to sell different types of insurance products, might have different areas of expertise, needs, etc. In some embodiments, agents in the first group 160 are selected for performance metrics related to sales. Agent sales performance may be measured by aggregate sales productivity metrics, as well as distributed performance metrics such as sales metrics by product types, etc.

In an embodiment, the agents in the second group 170 are not authorized to offer the product(s) to the inbound caller (prospective customer, or lead), but these agents are authorized to screen leads for prospective customers. Such agents perform an important role in lead nurturing. Forwarding an inbound inquiry to a live agent with little or no wait time, sometimes referred to herein as a "warm transfer," has been observed to significantly increase probability of a successful sale to that customer in a later interaction. In some embodiments, agents in the second group 170 are selected for skills related to agent-customer communications, which can be measured in indicators of customer satisfaction such as feedback on customer experiences.

In an embodiment, Polymr module 108 contains a lightweight, extensible search engine or API, implemented in the Python object-oriented programming language, https://www.python.org/. Various Python classes define key functions of the Polymr API:

Record: The Records class defines the basic unit of information contained in the Polymr index, comprised of strings based on Python's str class.
  class Polymr.record.Record
  Parameters of the Record class include:
  fields (tuple of str)—Attributes used to find a record. An indexer can use fields to organize records for easy lookup. A searcher can supply fields to find records.
  pk (tuple of str)—Primary key used to find this record in other databases.
  data—Attributes not used to find a record, but stored for other purposes.

In an embodiment, the Records class permits generation of iterators of records. In an example, the following command parses a csv file into an iterator of Polymr.record.Record:
  Polymr.record.from_csv(f, searched_fields_idxs=None, pk_field_idx=None, include_data=True, delimiter=',')
  Index: Contains functions for batch indexing.
  Polymr.index.create(input_records, nproc, chunksize, backend, tmpdir='/tmp', featurizer_name='default')

The Index function converts or "indexes" a collection of records into a populated storage backend. The indexed records can be used by the Query function, Polymr.query.Index. In various embodiments, parameters of the Index function include:
  input_records (Iterable of Polymr.record.Record)—Identifies the records to index.
  backend (Subclass of Polymr.storage.AbstractBackend)—Identifies a storage backend to populate.
  featurizer_name (str)—Identifies which Featurizer is used in indexing records (cf. Featurizer function).

Query: This module contains methods used to perform searches and to incrementally index records, i.e., add records to a previously created backend:
  class Polymr.query. Index(backend)
  Parameters include backend (subclass of class: Polymr.storage.AbstractBackend), which defines the storage backend from which to retrieve search results.
  Query module functions include:
  search(query, limit=5, r=100000, n=600, k=None, extract_func=<function features>, score_func=<function hit>)—Finds records that match a list of search fields. In an embodiment, parameters of the search command include:
  query (list of str) The search query, which searches for records that match the listed fields.
  limit (int)—The maximum number of search results to return.
  r (int)—The search space, defined as the maximum number of record IDs to tally before scoring search hits.
  n (int)—Maximum number of search hits to compare to the query
  k (int)—Maximum number of tokens to use when gathering search hits.
  extract_func (Callable that maps a list of str to anything that can be used by score_func)—A function used in scoring search hits. This function breaks up a list of search fields into features. The collection of features is then compared to determine a search score.
  score_func (Callable that maps the output from extract_func to a floating point format)—A function used in scoring search hits. This function takes feature collections output from extract_func to produce a floating point score. The score describes how well a query matches a search hit. Low scores are returned first.
  add(records, idxs=[ ])—Incrementally indexes one or more records; effects actions to add the records to the storage backend.
  close( )—Closes the index and cleans up any temporary files.

In an embodiment, the Polymr query compares search elements based on indexed customer identifiers with customer identification fields, which are search fields for the records sought in the search. For example, the Polymr may compare indexed customer identifiers with customer identification fields included in records of the ACXIOM Index 210, to retrieve customer demographic data associated with an inbound caller. In various embodiments, indexed customer identifiers are based on two or more of first name, last name, middle name, normalized street address, and zip code. In various embodiments, indexed customer identifiers are based on one or more of phone number and email address. In an embodiment, the Polymr query contains the same number of elements as the number of search fields in the index. For example, if a set of records were indexed with two customer identification fields, queries would be composed of two search elements, in which the first element searches through the first search field, and the second element searches through the second search field.

Util: A utility module contains utility functions used in indexing records, searching indexes, and scoring search results. The following function generates a list of n-grams by sliding window:
  Polymr.util.ngrams(s, k=3, step=1).
  For example, the function Polymr.util.ngrams('new york', 3, 1) generates: ['new', 'ew', 'wy', 'yo', 'yor', 'ork'].
  Parameters of this function include:
  s (str)—The string that is broken into n-grams;
  k (int)—Size of each n-gram to generate; also, herein called window length or kmer size;
  step (int)—Step size; how many character positions to move forward after each n-gram.

The following function computes the Jaccard distance between two strings:
  Polymr.util.jaccard(a, b)
  Featurizers: Contains functions for breaking up a search query into feature sets. In an embodiment, Featurizer functions compute n-gram sets of a record. Different Featurizer functions return n-gram sets of different of different kmer size, e.g.:
  kmer size of 2 and step size of 1 (returns 2-character n-gram bytestrings);
  kmer size of 3 and step size of 1 (returns 3-character n-gram bytestrings);
  kmer size of 4 and step size of 1 (returns 4-character n-gram bytestrings).

Score: This module contains functions for scoring search results. In an embodiment, this module includes the following methods:
  Polymr.score.features(fields)—breaks an iterator of search fields into 2-character n-gram sets;

Polymr.score.hit(query_features, result_features)—scores a search hit. In an embodiment, the score is defined as the average Jaccard distance among two n-gram sets (i.e., measure of similarity of the two data sets).

Storage: A Storage module contains the abstract backend class, i.e., a data access object.

class Polymr.storage.AbstractBackend

Example 1: In a use example of the Polymr API, a "data" directory of the source repository contained sample data comprising a CSV of the senators serving in the 190th Massachusetts general court. The source code repository contained the list contact information of these senators. A "ma_senators.csv" file was a CSV containing the first name, last name, party affiliation, room number, phone number, and email address of all senate members.

To index this sample data, the primary key was set to the 'senator's room number and the search fields were set to the 'senator's first name and last name. The API opened and indexed the data, and stored the indexed data in a LevelDB backend. Corresponding pseudo code to create a Polymr index named "ma_senators.Polymr" in the current directory using the LevelDB backend is described as follows:

```
doctest:
>>> import Polymr
>>>       be=Polymr.storage.LevelDBBackend('data/ma_senators.Polymr')
>>> with open('data/ma_senators.csv') as f:
...   records=Polymr.record.from_csv(
...   f,
...   searched_fields_idxs=[0,1],
...   pk_field_idx=3
...   )
...   Polymr.index.create(records, 1, 10, be)
...
>>> be.get_rowcount( )
```

A query subcommand searched through the index of contact information of the senators. Corresponding pseudo code using a batch method for searching is described as follows:

```
doctest::
>>> import Polymr
>>>          be=Polymr.storage.LevelDBBackend('data/ma_senators.Polymr')
>>> index=Polymr.query. Index(be)
>>> index.search(['","oconnor'])
  [{'fields': ['Patrick'. "O'Connor"], 'pk': '520', 'score': 0.7777777777777778,
  'data':
  [b'Republican',               b'617-722-1646',
    b'Patrick.OConnor@masenate.gov'].
  'rownum': 26}, {'fields': ['Kathleen'. "O'Connor Ives"].
  'pk': '215', 'score':
  0.8571428571428572, 'data': [b'Democrat', b'617-722-1604',
    b'Kathleen.OConnorIves@masenate.gov'],   'rownum':
    27}, {'fields': ['Sonia',
  'Chang-Diaz'], 'pk': '111', 'score': 1.0, 'data': [b'Democrat', b'617-722-1673',
    b'Sonia. Chang-Diaz @masenate.gov'], 'rownum': 5}]
```

Example 2: In a second use example of the Polymr API, the API opened and indexed the sample data including contact information of senators in the 190th Massachusetts general court, and stored the indexed data in a LevelDB backend, as in Example 1. A query subcommand added records to the index. Corresponding pseudo code for adding records incrementally is described as follows:

```
doctest::
>>> import Polymr
>>> be=
Polymr.storage.LevelDBBackend('data/ma_senators.Polymr')
>>> index=Polymr.query. Index(be)
>>> rec=Polymr.record.Record(
...   ['Sarah', "Connor"],
...   '911',
...   [b'Resistance', b'617-575-1300',
    b'Sarah Connor@masenate.gov']
...   )
>>> index.add([rec])
>>> index.search(['sarah', 'onno'])
  [{'fields': ['Sarah', 'Connor'], 'pk': '911', 'score': 0.4,
  'data': [b'Resistance', b'617-575-1300',
    b'Sarah.Connor(@masenate.gov'],   'rownum':    39},
  {'fields':
  ['Patrick', "O'Connor"], 'pk': '520', 'score':
  0.7857142857142857, 'data': [b'Republican', b'617-722-
    1646', b'Patrick.OConnor@masenate.gov'], 'rownum':
    26},
  {'fields': ['Kathleen', "O'Connor Ives"], 'pk': '215',
  'score':
  0.875, 'data': [b'Democrat', b'617-722-1604',
    b'Kathleen.OConnorIves@masenate.gov'],   'rownum':
    27}.
  {'fields': ['Karen', 'Spilka'], 'pk': '212', 'score':
  0.9285714285714286, 'data': [b'Democrat', b'617-722-
    1640', b'Karen.Spilka@masenate.gov'], 'rownum': 33}]
```

Figure 2:
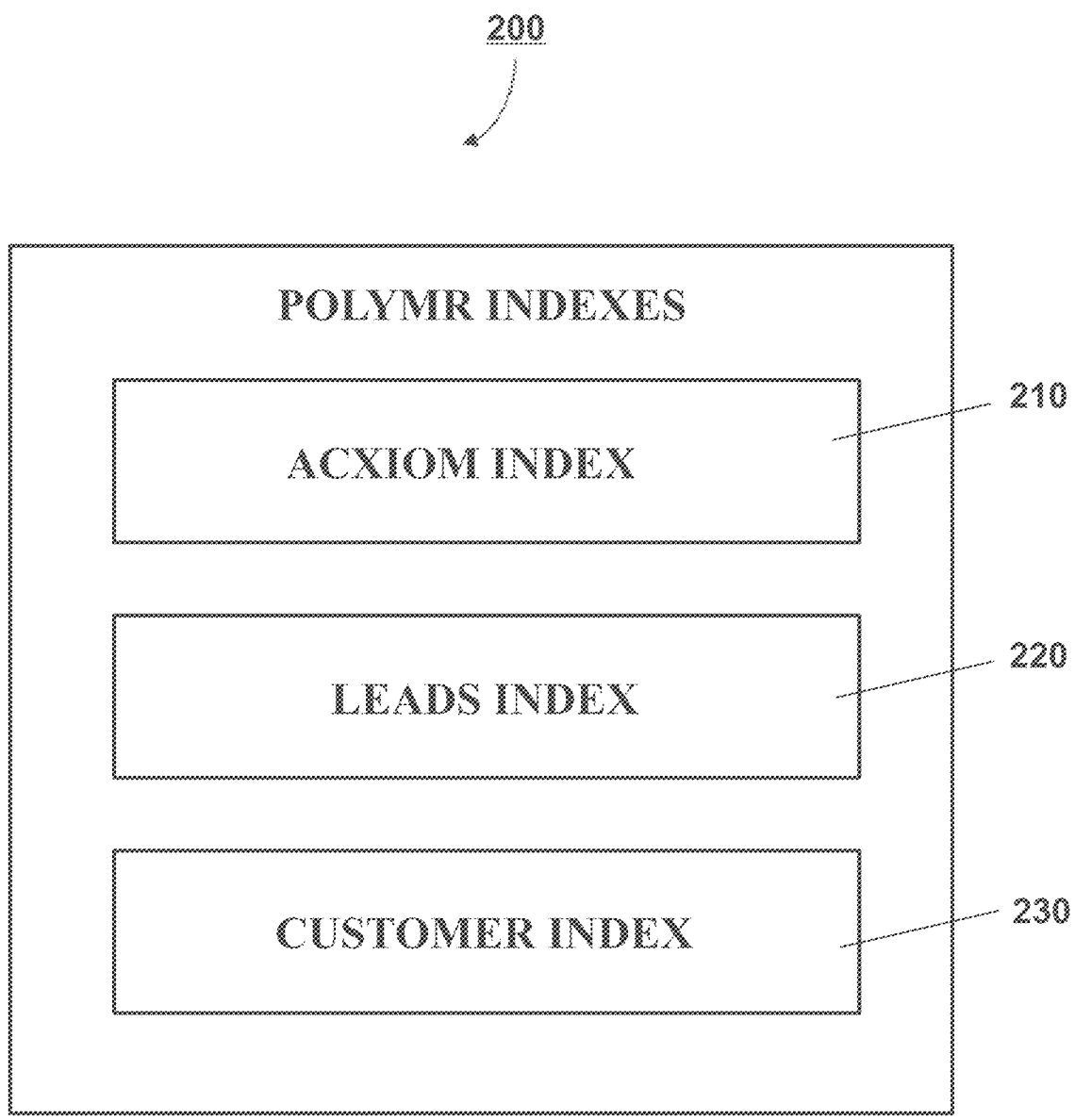
FIG. 2 is a block schematic diagram of indexed internal databases of a call center, according to an embodiment.

FIG. 2 is a diagram of Polymr indexes 200, an embodiment of Polymr indexes 126 of FIG. 1. Polymr indexes 200 include an Index 210, a Leads Index 220, and a Customer Index 230. In an embodiment, the Index 210 contains indexed demographic data obtained from Polymr queries of the customer demographic database 132. In an embodiment, Leads Index 220 and Customer Index 230 contain indexed data obtained from Polymr queries of the customer database 122. In an embodiment, these indexes also contain other data obtained from Polymr queries and value-based modeling of prior inbound callers.

Figure 3:
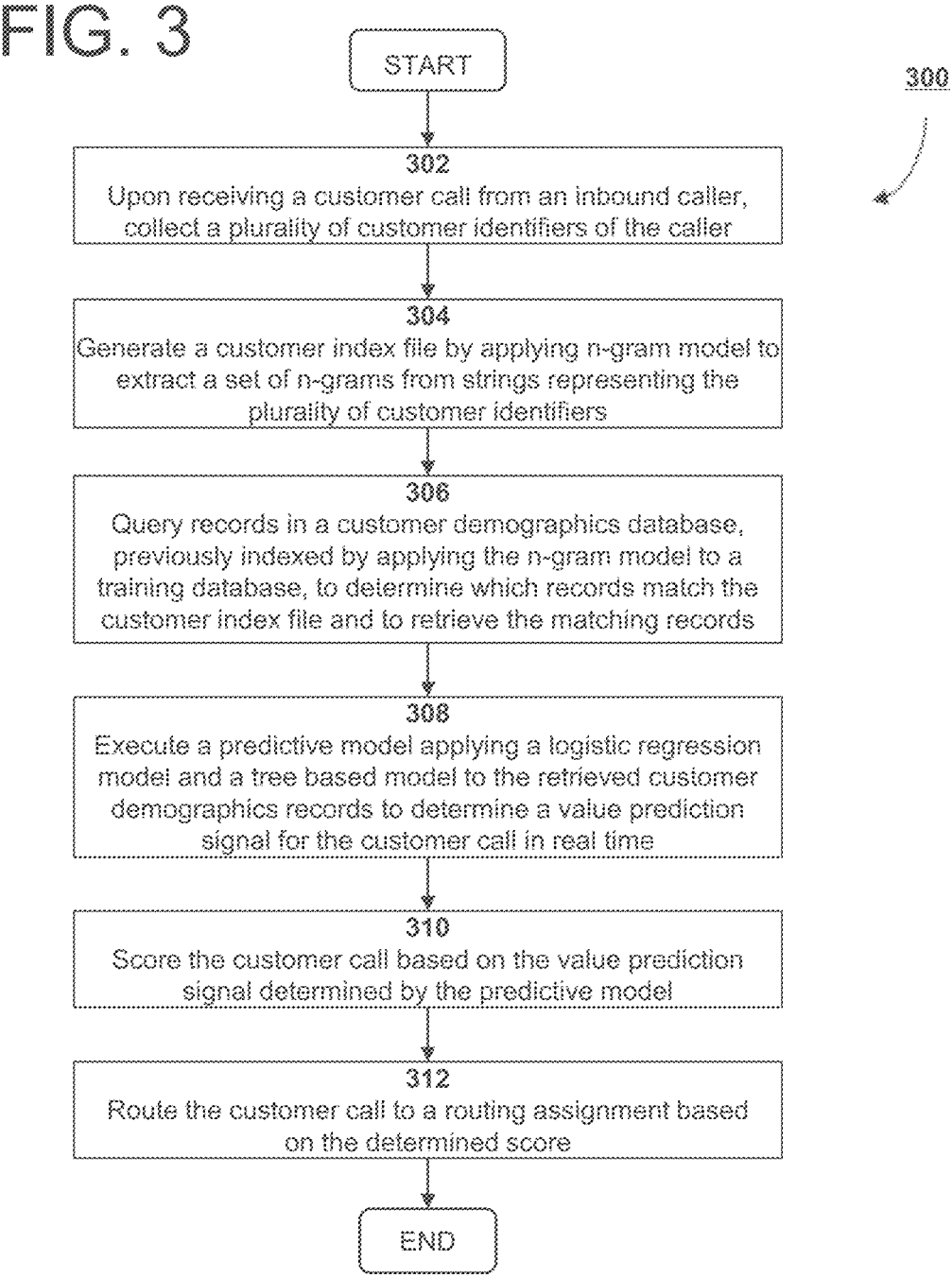
FIG. 3 illustrates a method for routing a customer call in accordance with an embodiment.

FIG. 3 shows an automated call-routing method 300 for managing customer calls in a call center, which uses an n-gram model and approximate string matching analysis to improve the reliability of retrieving matching records from a demographic database matching customer identifiers for an inbound call. Enhanced data concerning the inbound caller including the retrieved records are used in executing a predictive model for value-based scoring of the inbound caller. The method 300 routes the customer to a routing assignment based on the value-based score.

At step 302, upon receiving a customer call from an inbound caller, the method collects a plurality of identifiers associated with the inbound caller. In an embodiment, the customer identifiers include at least two of customer name, street address, and zip code. In some embodiments, customer identifiers include one or both of phone number, and email address, of the customer. In an embodiment, the customer name consists of one or more of first name, last name, and middle name. In an embodiment, the street address used as a customer identifier consists of a normalized postal address.

At step 304, the method generates a customer index file by applying an n-gram model to extract a set of n-grams from strings representing the plurality of customer identifiers. In an embodiment, the n-gram model includes a predetermined kmer size and a predetermined step size. In an embodiment, the customer index file is generated by applying the Index function of the Polymr extensible search engine.

At step 306, the method queries records in a customer demographic database to determine which of the records match the customer index file generated at step 304, and retrieves the matching records. In an embodiment, the customer demographic database was previously indexed by applying the n-gram model to extract n-grams from strings representing customer identification fields in a training database. In an embodiment, the customer demographic database was previously indexed by applying the Index function of the Polymr extensible search engine. In an embodiment, the query step 306 applies the Query function of the Polymr extensible search engine to the customer demographic database.

In an embodiment, the query step 306 applies approximate string matching analysis to compare the n-grams extracted from the strings representing the customer identification fields with the set of n-grams extracted from the strings representing the plurality of customer identifiers. The approximate string matching analysis generates a metric of the closeness of the n-grams extracted from the strings representing the customer identification fields to the set of n-grams extracted from the strings representing the plurality of customer identifiers, and compares the metric to a threshold. In an embodiment, the metric of closeness is a Jaccard distance.

In an embodiment, the query step 306 incorporates a Gaussian mixture model fitted to a graph representative of closeness of the customer training data to the n-grams from the strings representing the customer identification fields in the previously trained customer demographic database. In an embodiment, the Gaussian mixture model is a two-component mixture model.

At step 308, the method executes a predictive model to determine a value prediction signal for the inbound call in real time. In an embodiment, the predictive model applies a logistic regression model in conjunction with a tree-based model to the matching records retrieved from the customer demographic database in step 306.

At step 310 the method scores the customer call based on the value prediction signal determined at step 308. In an embodiment, the score classifies the customer call to one of a first value group and a second value group. In an embodiment, the first value group and the second value group model higher predicted value and lower predicted value, respectively, to an enterprise serviced by the call center (also herein called sponsoring organization).

At step 312, the method routes the customer call to a routing assignment based on the score determined at step 310. In various embodiments, the routing assignment comprises one or more of routing to a priority routing assignment, routing to a subordinate routing assignment, routing to a selected agent group, routing to an agent or agent group requested by the inbound caller, and routing to a general call queue. In various embodiments in which the scoring step classifies the inbound caller to one of a first value group and a second value group that model higher predicted value and lower predicted value, respectively, the routing step routes inbound callers classified in the first group to a prioritized routing assignment, and routes inbound callers classified in the second value group to a subordinate routing assignment.

Figure 4:
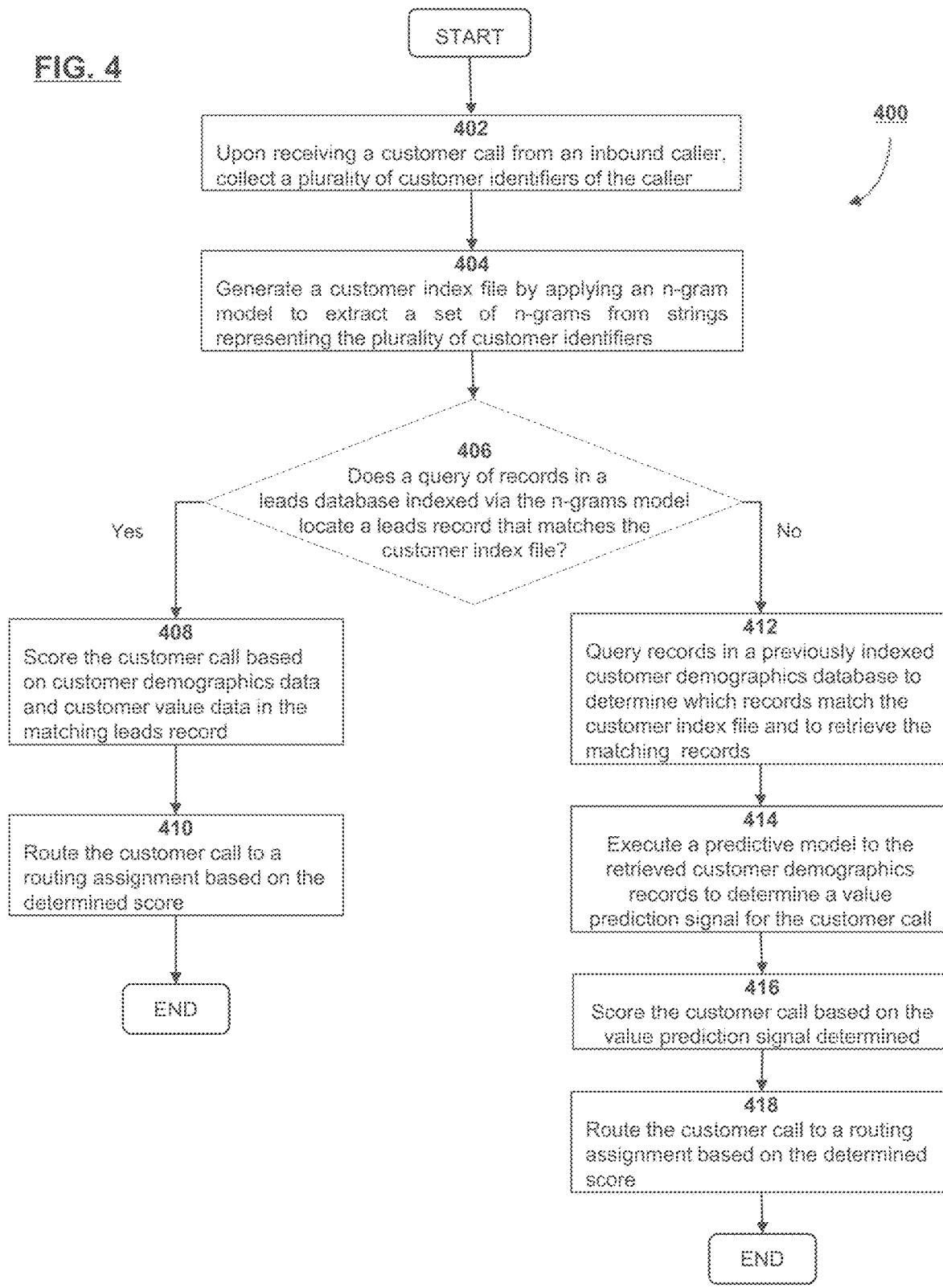
FIG. 4 illustrates a method for routing a customer call in accordance with an embodiment.

FIG. 4 shows an automated call-routing method 400 for managing customer calls in a call center. Method 400 which uses an n-gram model and approximate string matching analysis to improve the efficiency of automated call-routing in real time by determining whether customer identifiers associated with an inbound call match a record in a lead database. In an embodiment, the lead database includes records of leads of an enterprise serviced by the call center. If the method determines that the customer identifiers for the inbound caller match a record of a lead in the lead database, the method expedites data-gathering, value-based predictive modeling, and scoring of the inbound caller by using data previously gathered for the lead associated with the matching record. If the method determines that the customer identifiers for the inbound caller match no record of a lead in the lead database, the method proceeds with data-gathering, value-based predictive modeling, and scoring of the inbound caller. The automated call-routing method routes the customer caller to a routing assignment based on the score of the inbound caller, whether that score is obtained from a lead score previously determined or is determined currently for the inbound caller.

At step 402, upon receiving a customer call from an inbound caller, the method collects a plurality of identifiers associated with the inbound caller. In an embodiment, the customer identifiers include at least two of customer name, street address, and zip code. In some embodiments, customer identifiers include one or both of phone number, and email address, of the customer. In an embodiment, the customer name consists of one or more of first name, last name, and middle name. In an embodiment, the street address used as a customer identifier consists of a normalized postal address.

At step 404, the method generates a customer index file by applying an n-gram model to extract a set of n-grams from strings representing the plurality of customer identifiers. In an embodiment, the n-gram model includes a predetermined kmer size and a predetermined step size. In an embodiment, the customer index file is generated by applying the Index function of the Polymr extensible search engine.

At step 406, the method queries records in a customer demographic database to determine whether one of the records in a lead database matches the customer index file generated at step 404. In an embodiment, a given record of the lead database contains customer identifier fields, customer demographic data, and customer value data for a lead of an enterprise serviced by the call center. In an embodiment, the lead database was previously indexed by applying the n-gram model to customer identifier fields to extract n-grams from strings representing the customer identification fields. In an embodiment, the lead database was previously indexed by applying the Index function of the Polymr extensible search engine. In an embodiment, step 406 applies the Query function of the Polymr extensible search engine to the lead database. Other embodiments described as to step 306 in the method of FIG. 3 also may apply to step 406.

In the event step 406 determines that one of the records in the lead database matches the customer index file, at step 408 the method scores the customer call based on the customer demographic data and customer value data included in the matching lead record. At step 410, the method routes the customer call to a routing assignment based on the score determined at step 408. In various embodiments, the routing assignment comprises one or more of routing to a priority routing assignment, routing to a subordinate routing assignment, routing to a selected agent group, routing to an agent or agent group requested by the inbound caller, and routing to a general call queue.

In the event step 406 determines that none of the records in the lead database matches the customer index file, at step 412 the method retrieves records from a customer demographic data corresponding to the customer identifiers in the customer index file. Various embodiments of the query step 306 in the method of FIG. 3 may be employed for step 412.

At step 414, the method executes a predictive model to determine a value prediction signal for the inbound caller in real time. In an embodiment, the predictive model applies a logistic regression model in conjunction with a tree-based model to the matching records retrieved from the customer demographic database in step 412. At step 416 the method scores the customer call based on the value prediction signal determined at step 414. Various embodiments of the scoring step 310 of the method of FIG. 3 may be employed for the scoring step 416.

At step 418, the method routes the customer call to a routing assignment based on the score determined at step 416. Various call routing embodiments may be employed for the routing step 418.

Figure 5:
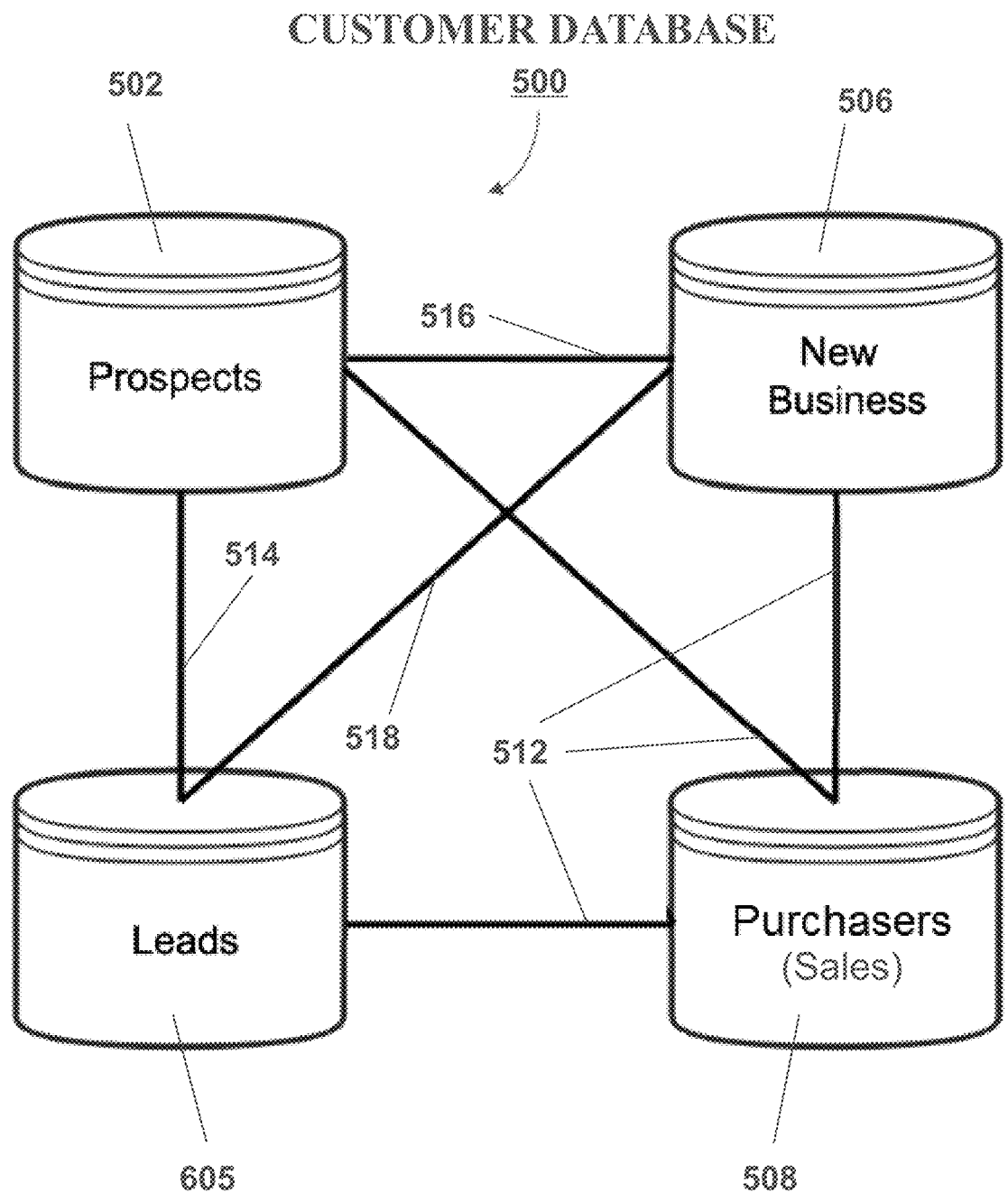
FIG. 5 is an architecture for a customer database including data stores for four target groups for marketing and customer acquisition, in accordance with an embodiment.

FIG. 5 is an architecture of a customer database 500, representing an embodiment of the customer database 122 of FIG. 1. Customer database 500 is an internal database of the sponsoring organization of the call center or other enterprise. Customer database 500 stores information on individual customers of the enterprise, associating these customers with one or more of the groups Prospects 502, Leads 504, New Business 506 and Purchasers (Sales) 508. Customer database 500 includes links between each customer group and each of the other groups. These links between customer groups are sometimes herein called attributions. There are unique keys 512 between Purchasers (Sales) and each of the other data stores; a unique key 514 between Prospects 502 and Leads 504; a unique key 516 between Prospects 502 and New Business 506; and a unique key 518 between Leads 504 and New Business 506. In addition, customer database 500 tracks event data for customer-related activities, such as promotional activities, customer-prospecting activities, and call center CRM activities. Customer database 500 joins customer information across these four groups, as well as attributions and events data, in order to better match call center resources to customer needs, evaluate marketing and call center activities, build stronger models, and generate useful reports.

Customer database 500 employs attribution processes for tracking customers across events in customer acquisition and marketing. The objective of attribution is to track people across events, i.e., prospects, leads, applications and sales. Customer database 500 uses exact matching of personal details in order to determine which prospects may have become leads, submitted new business applications and/or bought products; and which leads may have submitted new business applications and/or bought products. In an embodiment, customer database 500 additionally employs matching algorithms for matching personal details with lead data retrieved from third-party demographic databases, such as the customer demographic database 132.

Figure 6:
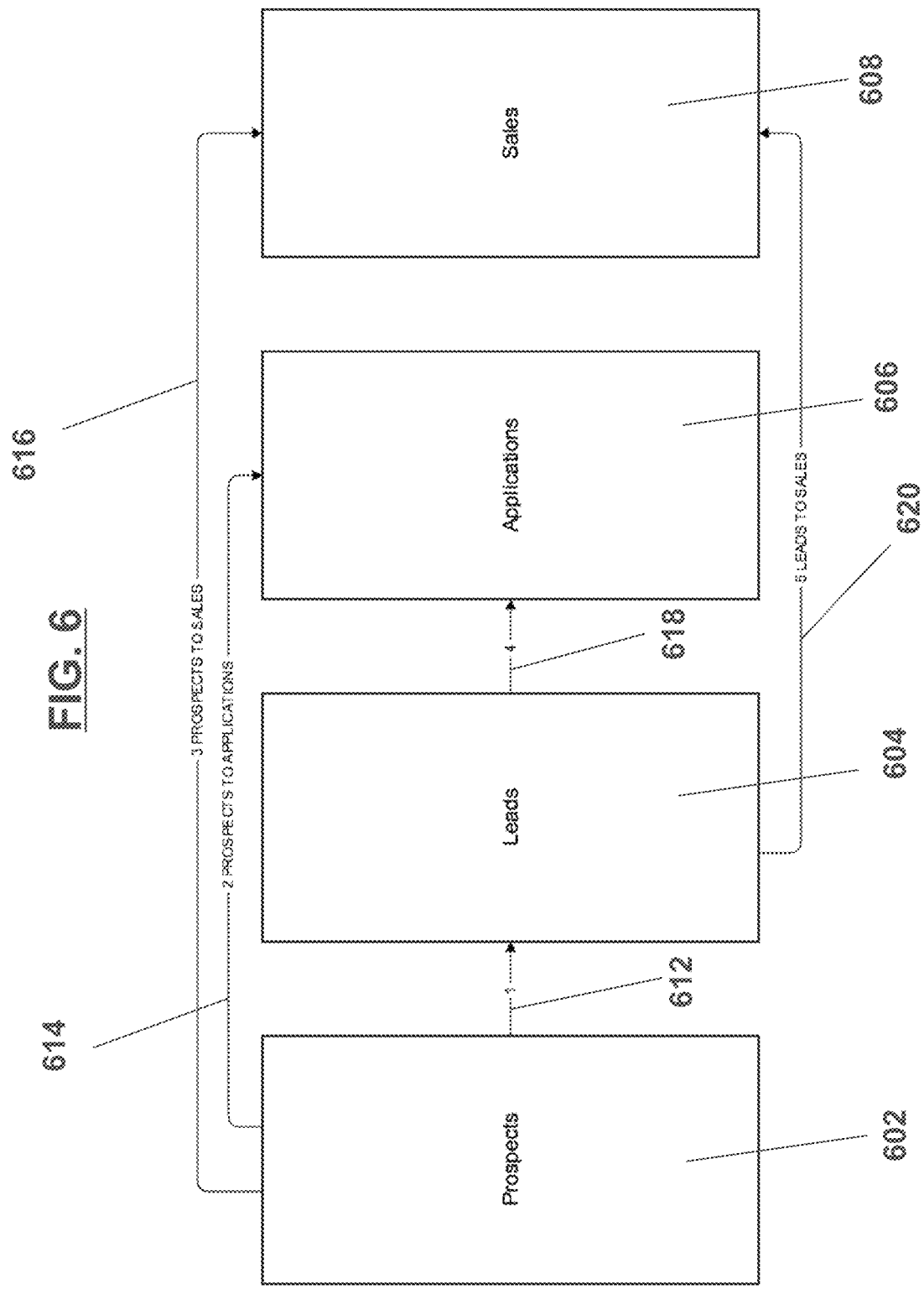
FIG. 6 is a flow chart diagram of attribution processes for tracking persons across events between customer groups (prospects, leads, new business applicants, and sales), in accordance with an embodiment.

The flow chart diagram of FIG. 6 shows attribution processes for tracking persons across events between the customer groups. FIG. 6 shows four customer groups, herein sometimes called "customer events," or alternatively, "customer event data": prospects 602, leads 604, applications 606 and sales 608. An individual customer can follow several different paths. For example, the customer might be a prospect who goes straight to a sale; might go through the leads pipeline; might submit an application but never buy the product, etc. Events also can include "activity events," such as promotional activities, customer-prospecting activities, and call center CRM activities. Customer database data tracking such activity events are sometimes herein called activity events data.

In an embodiment, events tracked by Customer database 600 include pairs of events consisting of an event that occurs earlier in time (also herein called prior event; e.g., event A) and an event that occurs later in time (also herein called subsequent event; e.g., event B). Attribution serves two primary functions. The first function is to trace all instances of a prior event A to see where these instances ended up. An example of this function is: "Find all leads, applications and sales that resulted from prospecting activity on X date." The second function is to determine, for any record of a subsequent event B, which instance of event A most likely caused event B. An example of this function is: "Which prospecting activities were responsible for TERM product sales this month?"

Each arrow of FIG. 6 represents one of five attribution processes 612, 614, 616, 618, and 620. The illustrated embodiment does not include an attribution between applications and sales, because tracking between them is very simple. In another embodiment, the attributions would include an attribution between applications and sales. Each arrow is numbered (1, 2, 3, 4, or 5), representing the order in which these attribution processes are run. In an embodiment, each attribution process carries out the following steps, in order: (1) Match records between event A and event B, where event B occurs later in time. For example, in the prospect to leads attribution 612, prospect is event A and leads is event B; (2) Filter matches based on a time limit determined by business rules; (3) Determine the best match, i.e., the single record from event A that most likely led to each record from event B; and (4) Load unique best matches to the attribution table, updating the historical table.

Figure 7:
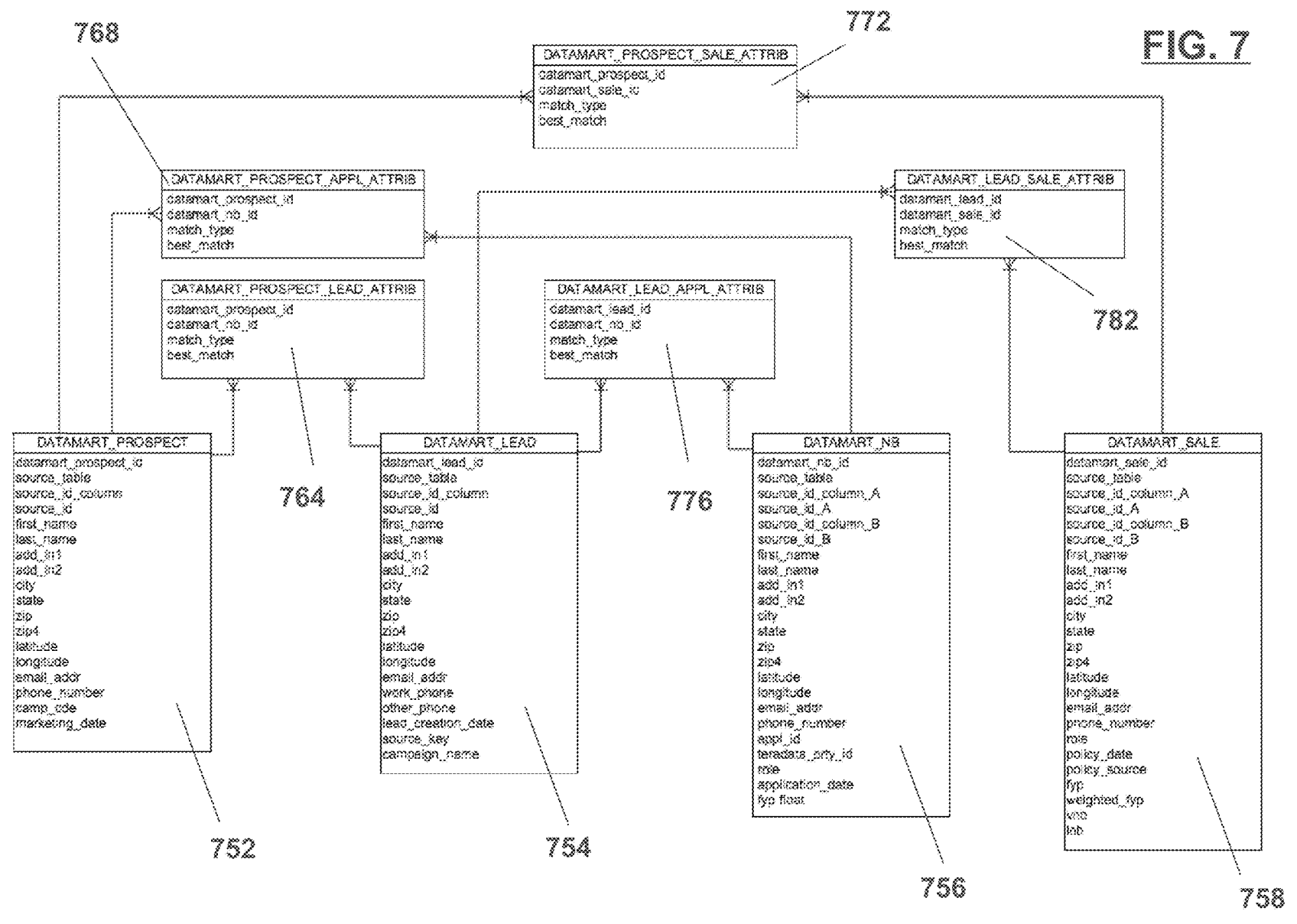

FIG. 7 is a schematic diagram of customer database event tables for the customer groups prospect, lead, new business and sale, and of attribution tables between events. Customer database event tables pool all prospects, leads, applications and sales across the enterprise into four standardized tables 752, 754, 756, 758. In an embodiment, prospect events data include, e.g., camp_cde (code of the marketing campaign that targeted the prospect), and marketing_date (earliest known date for the prospect). In an embodiment, leads events data include, e.g., lead_creation_date (earliest known date for the lead), and source_key (data that identifies the lead's corresponding prospect, where applicable). In an embodiment, new business events data includes, e.g., role (role of the person in the record has on an insurance policy, such as owner, insured, or payer), and fyp (first year premium). In an embodiment, Sale events data include, e.g., policy_date (earliest known date for the policy), and vnb (value of new business).

In an embodiment of the system of FIG. 1, various data in customer database 122 are also stored in other internal databases 120 of the enterprise, such as call history database 124. The latter databases may act as source systems for customer database 122. Referring again to FIG. 7, customer database records may have values in the columns source_table, source_id_column, and source_id, indicating how to access information in the source system. Additionally, various of these databases may provide source data for Leads Index 220 and a Customer Index 230.

Attribution creates attribution tables by applying rules to the customer database event tables. The attribution tables 764, 768, 772, 776, and 782 of FIG. 7 provide the basic data representing the relationship between each pair of events 752, 754, 756, 758. In addition, the customer database 700 can build overall tables that aggregate all the relationships between prospect, lead, new business, and sales. For example, if a prospect is attributed to a lead, which in turn is attributed to a sale, an overall table would represent these relationships in a single row. In various embodiments, customer database builds reports via overall tables that apply analytics to select data using one or more of attribution tables 764, 768, 772, 776, and 782. In various embodiments, the analytics include criteria based on activity events.

In an example, the customer database 700 builds a report to answer the question: "What is the response rate for the Term to Perm campaign?" The customer database selects data using the marketing.datamart_prospect_lead_attrib table 764. The customer database applies analytics to focus on the Term to Perm marketing campaign, counting the number of leads generated from the total prospects. In another example, the customer database 700 builds a report to answer the question: "What is the conversion rate for the Retirement campaign?" The customer database selects data using the marketing.datamart_prospect_appl_attrib table 768. The customer database applies analytics to focus on the Retirement marketing campaign, counting the percentage of applications generated from the total prospects.

In an exemplary embodiment, customer management system 100 utilizes data from both internal and external sources in pre-sale predictive modeling of sale of a financial product (insurance policy). The data include internal data 120 of the call center that tracks enterprise customer data for prospects, leads, and purchasers of the call center. Additionally, other internal databases 120 may include tracked historical information about leads, customers, and marketing costs of the call center, including historical sales and lapse information. In an embodiment, these internal databases use rmm_analytics schema in data warehouse software.

In an embodiment, internal databases 120 use rmm_analytics schema in VERTICA to generate a table of enterprise customer data. In another embodiment, internal databases 120 use rmm_analytics schema to generate additional data tables, such as a table of historical lead data and customer data, and a table of marketing costs data. In an illustrative embodiment, a paid_flag indicates policy payments and a lapse_flag indicates that a policy has lapsed. Date fields are used for filtering data by date range. In an exemplary embodiment, information about purchasers and information about marketing costs was used to model a pre-determined period of time of payments following the sale of the product that defines lapse. In an exemplary embodiment, for the purpose of pre-sale predictive modeling of sale of an insurance policy, this modeling resulted in defining lapse as failure of the customer to maintain a purchased policy in force for at least 18 months.

In the exemplary embodiment, data used in predictive modeling also include data retrieved from customer demographic database 132 to obtain information about customers. In an embodiment, customer demographic data include individual-level data on customers. In various embodiments, as a prerequisite to using data in predictive modeling of a given inbound caller (customer), Polymr module 108 indexes the data using customer identifiers for customer training data, and stores this index in Index 210.

In an embodiment, indexed customer demographic data in Index 210 also includes data using zip-level features of the system, which provide a coarser representation in building the predictive model. Such zip-level features employ variables that have resolution at the zip-level for each individual in the zip code. In an exemplary embodiment, zip-level data for individual income is associated with a zip code median value. Reasons for using zip-level data in predictive modeling include, for example, lack of a statistically significant difference in model performance as a function of any Polymr match score threshold; simplicity of collecting only the name and zip code in the VRU system 144; and privacy considerations as to individual-level data.

In an embodiment, inbound routing management system 102 labels each data element in the ACXIOM Index 210 as continuous (including interval), binary, ordinal, or nominal (categorical). For use in a logistic regression model 114, variables that have lookup fields are converted to integers. Following feature transformation of the Acxiom variables, the final view outputs each variable with human-readable names (if known), and a tag at the end of the variable name. Exemplary end tags for transformed ACXIOM variable names include:

_binary: either 0 or 1
_ordinal_to_binary: either 0 or 1, where null values are mapped to 0
_flat_binary: mapped from a string field like "01001000" into multiple fields
_ordinal: as an integer, with null values left null
_interval: as an integer, with null values left null
_continuous: as an integer, with null values left null
_nominal: as an integer, with null values mapped to an additional integer By applying the feature transformation rules described above, analytical engine 104 builds a simplified input data file from data retrieved from ACXIOM. This simplified input data file facilitates predictive modeling with a binary target.

Predictive modeling module 110 builds both a regression model 114 and a tree-based model 118. In an embodiment, the predictive modeling module 110 trains a logistic regression model 114 with $l_1$ regularization on the full set of features of the ACXIOM® database. Use of logistic regression for classification problems provides performance advantages over standard linear regression because application of the logistic function to the raw model score maps the output precisely from 0→1 while providing a smooth decision boundary. In an embodiment, the logistic regression model with $l_1$ regularization utilizes LASSO (Least Absolute Shrinkage and Selection Operator), a regression analysis method that performs both variable selection and regularization to enhance prediction accuracy and ease of interpretation of the resulting statistical model.

$l_1$ regularization provides the benefit of simplifying the selection of features through the model training process by constraining features with lower correlation to have 0 weight. The general form for a linear model can be indicated as:

$$\hat{y}(w, x) = w_0 + w_1 x_1 + \ldots + w_p x_p$$

for $\hat{y}$ to be predicted from data points in the array x by learned coefficients w. The $l_1$ regularization is achieved by adding a term to the cost function, as follows:

$$\min_w \frac{1}{2n_{samples}} \|Xw - y\|_2^2 + \alpha \|w\|_1$$

with regularization weight α. In an embodiment, the logistic regression model with $l_1$ regularization sets the regularization parameter a using cross-validation, with best-performing values typically around 0.005-0.01.

In another embodiment, regression model employs logistic regression with $l_2$ regularization, sometimes called ridge regression, according to the formula:

$$\min_w \frac{1}{2n_{samples}} \|Xw - y\|_2^2 + a\|w\|_2$$

In the $l_2$ regularization model, as in the $l_1$ regularization model, the regularization weight $\alpha$ is set by cross-validation. In an embodiment, a logistic regression model with $l_2$ regularization uses a backward feature selection procedure to select an optimal number of features. This feature selection procedure is the RFECV method for recursive feature elimination in Scikit-learn. (Scikit-learn is a software machine-learning library for the Python programming language, available at https://github.com/scikit-learn/scikit-learn).

In various embodiments, both $l_1$ and $l_2$ regularization models fit a regularization hyperparameter using five folds for cross-validation and searching across the seven parameters: [0, 0.001, 0.005, 0.01, 0.1, 0.5, 1]. In repeated iterations of model training, this range is restricted around previously successful settings.

In an embodiment, the tree-based model 118 is a random forests model. Random forests is a class of ensemble methods used for classification problems. Random forests models work by fitting an ensemble of decision-tree classifiers on sub samples of the data. Each tree only sees a portion of the data, drawing samples of equal size with replacement. Each tree can use only a limited number of features. By averaging the output of classification across the ensemble, the random forests model can limit over-fitting that might otherwise occur in a decision-tree model.

In an embodiment, the tree-based model 118 uses the random forests model in Python's scikit-learn. In an exemplary embodiment, the tree-based model 118 uses the following parameters in the scikit-learn random forests model:
Maximum tree depth: 3 or ∞, set with max_depth.
Maximum number of features considered when looking for the best split: 3→6, set with max_features.
Minimum number of samples required to split a node of the tree: 2→11, set with min_samples_split.
Minimum number of samples to be a leaf node: 1→11, set with min_samples_leaf.
Number of trees in the forest: 100 or 200, set by n_estimators.
Whether to sample with replacement for the data seen by each tree: true or false, set by bootstrap.
Function to measure quality of a split: Gini or Entropy (information gain), set as criterion.

In an embodiment, for each customer the predictive model generates a value prediction signal indicative of potential value of a sales transaction for that customer. In an embodiment, the value prediction signal is representative of the likelihood that the customer will accept the offer to purchase the product. In another embodiment, the value prediction signal may be representative of the likelihood that the customer will lapse in payments for the purchased product; or may be representative of the likelihood that the customer will accept the offer to purchase the financial product and will not lapse in payments for the purchased product. The predictive model can provide, for example: (a) buy-only signal, representative of the likelihood that the customer will accept the offer to purchase the product; (b) lapse-only signal representative of the likelihood that the customer will lapse in payments for the purchased product; (c) buy-don't-lapse signal, representative of the likelihood that the customer will accept the offer to purchase the financial product and will not lapse in payments for the purchased product. In addition, the predictive model can provide combinations of these signals.

Predictive models 110 effect a degree of feature selection. In various embodiments, predictive models identify features that have the most pronounced impact on predicted value. Different types of models may identify different features as most important. For example, a model based upon a buy-only signal may identify different leading features than a model based upon a lapse-only signal. Table 1 shows the top 15 features from the $l_1$ buy-don't-lapse model. The most important feature of this target is the expectant_parent_nominal variable, where a 0 corresponds to not expectant. These data indicate that non-expectant parents are less likely to buy, and less likely to lapse.

TABLE 1

Features from $l_1$ buy-don't-lapse model

| Importance | Feature |
|---|---|
| −2.7125 | expectant_parent_nominal |
| −0.3126 | recent_divorce_nominal_0 |
| −0.2634 | credit_card_new_issue_nominal_0 |
| −0.1438 | gender_input_individual_nominal_0 |
| 0.1117 | socially_influenced_ordinal |
| 0.0890 | home_length_of_residence_interval |
| −0.0757 | likely_investors_nominal_0 |
| −0.0667 | vacation_travel_international_would_enjoy_ordinal_to_binary |
| 0.0637 | total_liquid_investible_assets_fin_ordinal |
| −0.0632 | new_mover_nominal_0 |
| −0.0518 | single_parent_ordinal_to_binary |
| −0.0517 | vacation_travel_time_share_have_taken_ordinal_to_binary |
| −0.0455 | investments_real_estate_ordinal_to_binary |
| 0.0438 | investments_stocks_bonds_ordinal_to_binary |
| 0.0429 | obtain_life_insurance_along_with_loan_mortgage_installment_payments_ordinal |

Figure 8:
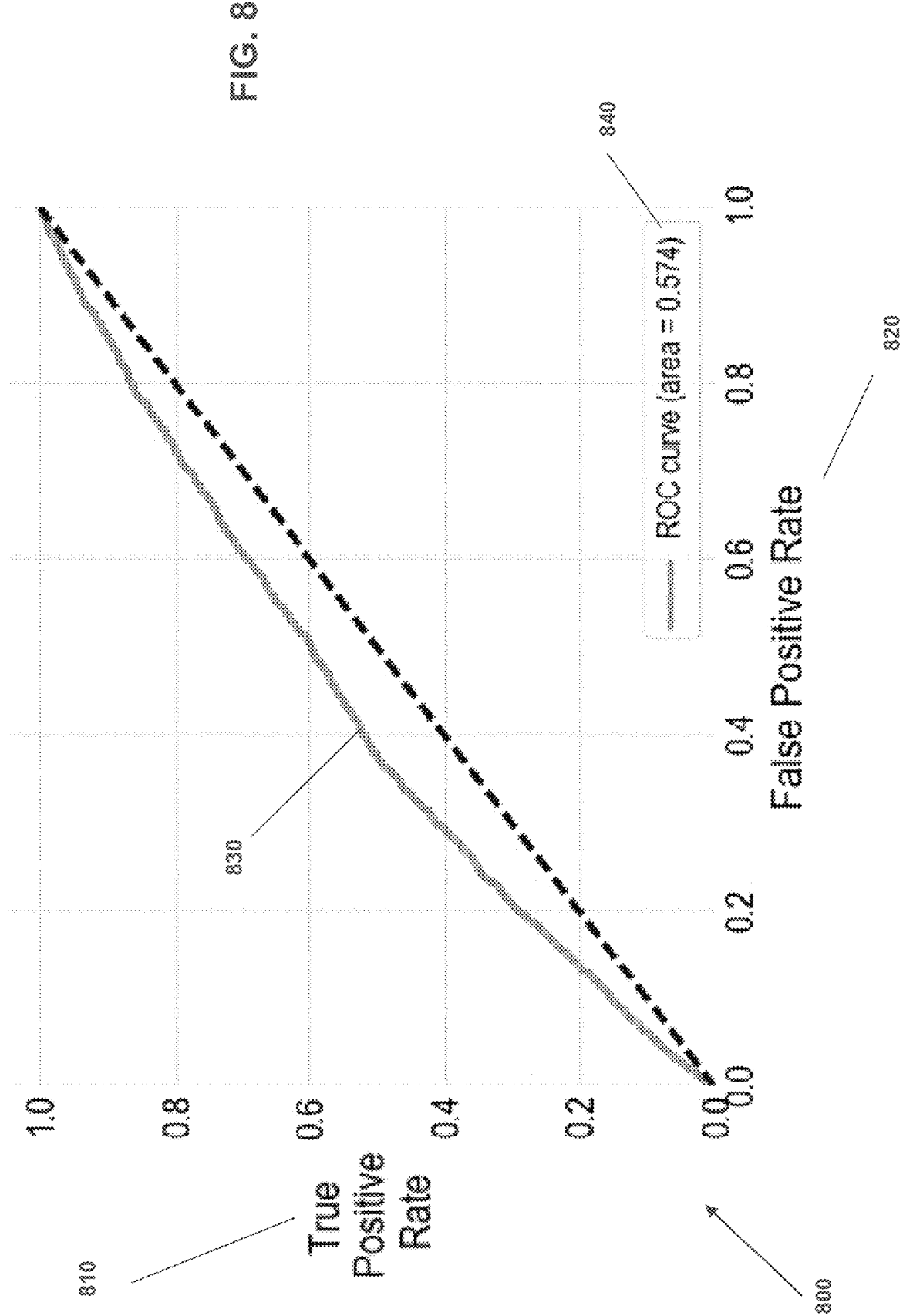
FIG. 8 is a graph of a receiver operator curve (ROC) for a value prediction model, in accordance with an embodiment.

In an embodiment, in building the predictive model 110, the call center evaluates performance of prospective models, such as test models, for efficacy in predicting buying behavior and/or lapse behavior. In an embodiment, prospective models are tested for the area under the curve (AUC) of a receiver-operator curve (ROC). FIG. 8 is an example 800 of an ROC curve 830. The receiver-operating characteristic (ROC) curve plots the true positive rate (Sensitivity) 890 as a function of the false positive rate (100-Specificity) 820 for different cut-off points. Each point on the ROC curve 830 represents a sensitivity/specificity pair corresponding to a particular decision threshold. An ROC curve with a higher area under the curve (AUC) generally indicates a higher-performing model. The ROC 800 of FIG. 8 was obtained in testing a logistic regression model with $l_1$ regularization on the lapse-only signal, and has an area under the curve (AUC) 840 of 0.574, indicating a high-performing model.

Figure 9:
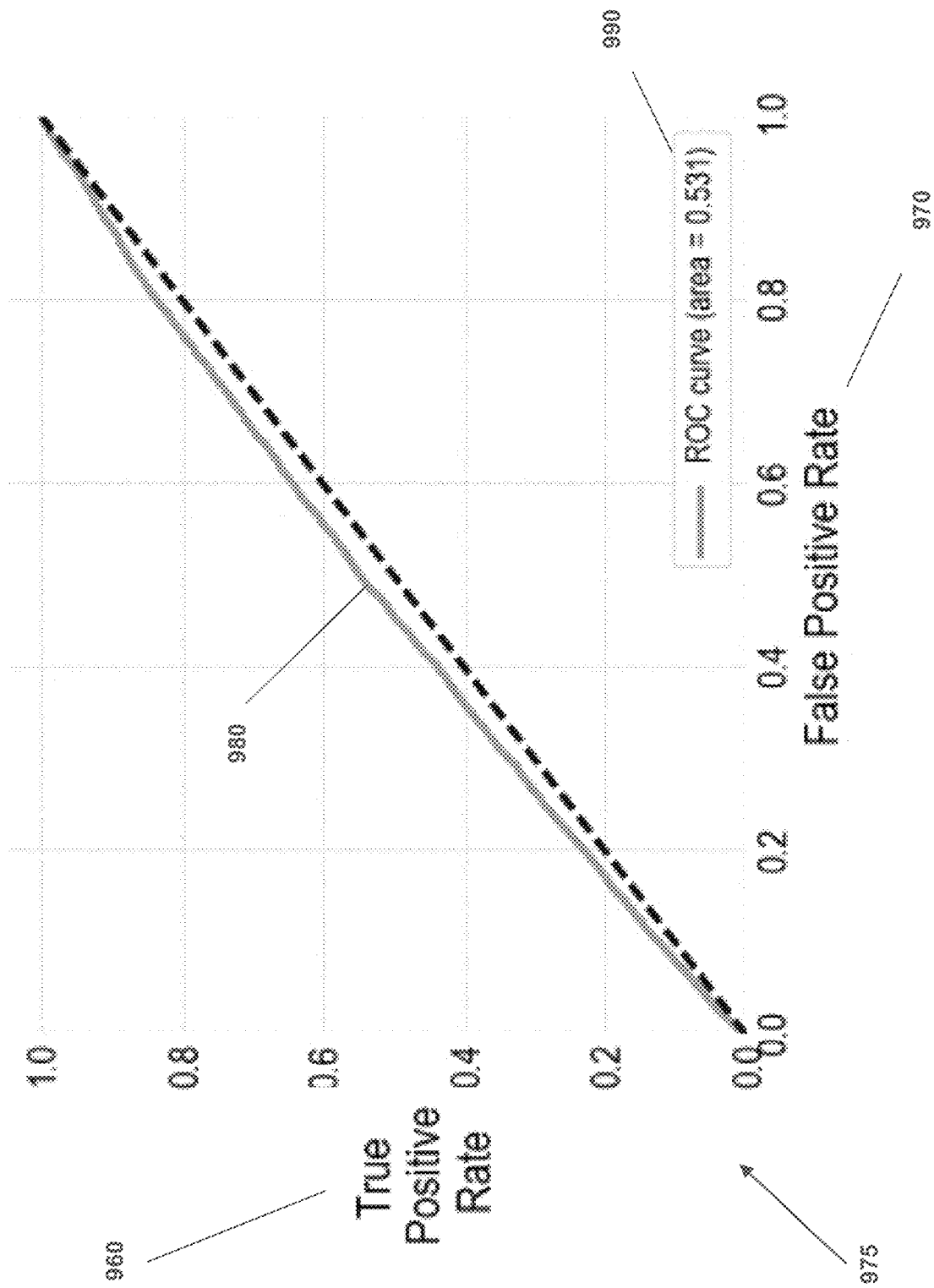
FIG. 9 is a graph of a receiver operator curve (ROC) for a value prediction model, in accordance with an embodiment.

FIG. 9 is another example of another receiver-operator curve (ROC) 950, obtained by testing a logistic regression model with $l_2$ regularization on the buy-only signal trained using all leads. (Sensitivity) 960 as a function of the false positive rate (100-Specificity) 970 for different cut-off points. Each point on the ROC curve 980 represents a sensitivity/specificity pair corresponding to a particular decision threshold. (ROC) 950 has an area under the curve (AUC) 990 of 0.531.

In an embodiment, prospective predictive models are tested for performance by measuring lift across deciles. Lift is a measure of the degree of improvement of a predictive model over analysis without a model. For a binary classifier model, decile lift is applied to deciles of the target records ranked by predicted probability.

In building the predictive models of the present disclosure, model datasets may have populations in the hundreds of thousands or millions of individuals. Model datasets may include training datasets and testing datasets. Filtering techniques can be applied to eliminate false data and for de-duplicating, reducing the number of records but significantly improving quality of model datasets.

Example 3: In automated call-routing processes that run operationally in real time, the Polymr search engine serves as fast-lookup tool for real-time matching. Applicant has observed that the Polymr tool significantly increases match rates in matching records in the ACXIOM® database in comparison to prior exact match lookup procedures, with low incidence of false positives.

A comparison of Polymr to prior match procedures computed distances between ACXIOM rows and missed leads, ACXIOM records that were missed using prior look-up. Each attribute, such as normalized street address, was featurized into a set composed of all two-character tuples. Corresponding attributes were compared for similarity using the Jaccard distance, $$1 - \frac{|A \cap B|}{|A \cup B|}$$

where A and B are the two-character tuple sets for the two attributes to be compared. The comparison procedure combined Jaccard distances for the six different attributes using the arithmetic mean to produce one distance per lead (ACXIOM row).

Figure 10:
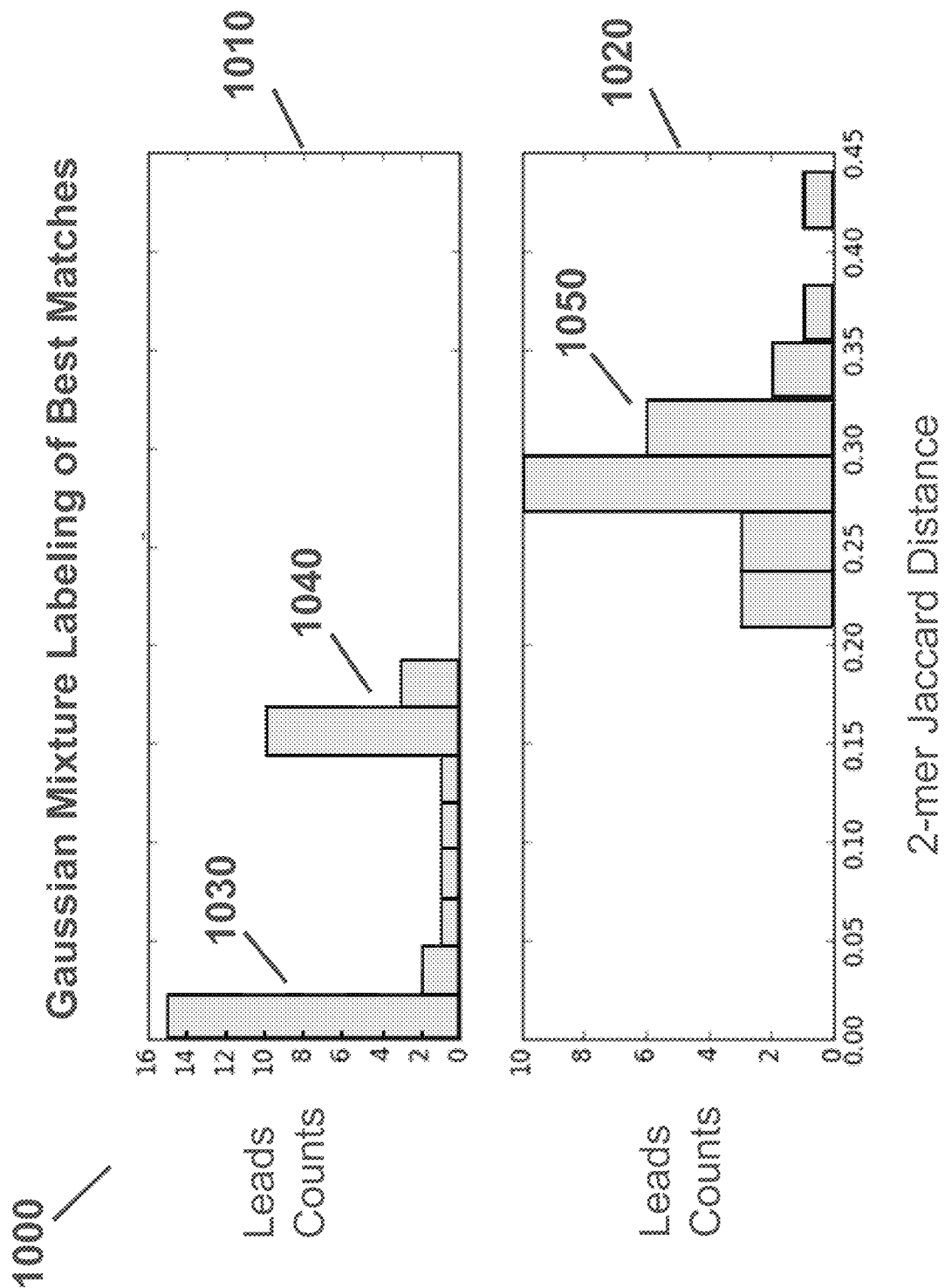
FIG. 10 is a graph of Gaussian mixture labeling of best matches of featurized customer identifiers to customer identification fields in the ACXIOM database.

As shown in FIG. 10, the approximate string matching analysis of Example 3 fitted a two-component Gaussian mixture to match scores for a test set of 60 leads. The model was fitted using expectation maximization on match scores greater than zero, and the best match distances were given a confidence metric. The best match distances were then given a confidence metric with the following log ratio:

$$\log\left(\frac{Pr_{left}}{Pr_{right}}\right)$$

where $Pr_{left}$ is the probability that the match distance was drawn from the component with the smaller mean and $Pr_{right}$ is the probability that the match distance was drawn from the component with the larger mean. A match was labeled as a positive if the log ratio confidence metric was greater than 1, denoting that the model was as or more confident the match was from the Gaussian distribution with the smaller mean.

The graph 1000 of FIG. 10 includes a first panel 1010 that plots a Gaussian distribution including the component 1040 with the smaller mean, and a second panel 1020 that plots a Gaussian distribution including the component 1050 with the larger mean. Of the 60 leads, 10 were perfect matches 1030. Of the 43 other leads, 22 were labeled as positive matches based on the Gaussian mixture, and 21 were labeled as negative matches. The sample set plotted in FIG. 10 showed that matches from the Gaussian distribution 1040 with the smaller mean were highly likely to be true matches, while matches from the Gaussian distribution 1050 with the larger mean were likely to be false matches. More generally, in approximate string matching of customer identifiers such as name and address, applicant has observed that the smaller mean in a two-component Gaussian mixture includes predominantly valid matches, which may overcome minor data entry errors or may represent modest changes to name or address, while the larger mean in the Gaussian mixture includes many false matches.

Example 4: The Polymr tool was employed to join leads to the ACXIOM file using customer identification fields, such as name and normalized address, in a test data set. In an exemplary application, to build the test data set, the Polymr tool was run simultaneously across four cores. In a full day search, this test successfully matched 25,000 records at an average rate of 2.5 seconds per match, i.e., 10 seconds on each core.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits and algorithm steps described in connection with the embodiments disclosed herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory, computer-readable, or processor-readable storage medium. The steps of a method or algorithm disclosed here may be embodied in a processor-executable software module which may reside on a computer-readable or processor-readable storage medium. A non-transitory, computer-readable, or processor-readable media includes both computer storage media and tangible storage media that facilitate transfer of a computer program from one place to another. A non-transitory, processor-readable storage media may be any available media that may be accessed by a computer. By way of example, and not limitation, such non-transitory processor-readable media may comprise RAM, ROM, EEPROM, CD-ROM, or other optical disk storage, magnetic disk storage, or other magnetic storage devices, or any other tangible storage medium that may be used to store desired program code in the form of instructions or data structures, and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor-readable medium and/or computer-readable medium, which may be incorporated into a computer program product.

What is claimed is:

1. A method for managing customer calls within a call center, comprising:
   upon receiving a customer call within the call center from an inbound caller, retrieving, by a processor, a customer identifier associated with the inbound caller;
   querying, by the processor, records in a customer demographic database to determine which of the records in the customer demographic database correspond to the customer identifier;
   executing, by the processor, a predictive machine-learning model configured to determine a value prediction signal representative of value of the inbound caller by applying the predictive machine-learning model to the records retrieved from the customer demographic database;
   routing, by the processor, the customer call to a call queue in accordance with the value prediction signal.

2. The method of claim 1, wherein the value prediction signal corresponds to a likelihood of the inbound caller lapsing.

3. The method of claim 1, wherein the value prediction signal corresponds to a likelihood of the inbound caller accepting an offer.

4. The method of claim 1, further comprising:
   identifying, by the processor, the records within the customer demographic database by generating an n-gram corresponding to the customer identifier and applying an n-gram model to extract a set of n-grams from strings representing a plurality of customer identifiers that correspond to the inbound caller.

5. The method of claim 4, further comprising:
   applying, by the processor, approximate string matching analysis to identify the set of n-grams extracted from the strings representing the plurality of customer identifiers.

6. The method of claim 4, wherein the n-gram model comprises a predetermined kmer size or a predetermined step size.

7. The method of claim 1, further comprising:
   analyzing, by the processor, records in a lead database to determine whether any of the records in the lead database corresponds to the inbound caller.

8. A system comprising:
   a processor; and
   a non-transitory computer readable medium in communication with the processor, the computer readable medium configured to store a set of instructions, wherein when executed, the set of instructions cause the processor to:
      upon receiving a customer call within the call center from an inbound caller, retrieve a customer identifier associated with the inbound caller;
      query records in a customer demographic database to determine which of the records in the customer demographic database correspond to the customer identifier;
      execute a predictive machine-learning model configured to determine a value prediction signal representative of value of the inbound caller by applying the predictive machine-learning model to the records retrieved from the customer demographic database;
      route the customer call to a call queue in accordance with the value prediction signal.

9. The system of claim 8, wherein the value prediction signal corresponds to a likelihood of the inbound caller lapsing.

10. The system of claim 8, wherein the value prediction signal corresponds to a likelihood of the inbound caller accepting an offer.

11. The system of claim 8, wherein the set of instructions further cause the processor to:
    identify the records within the customer demographic database by generating an n-gram corresponding to the customer identifier and applying an n-gram model to extract a set of n-grams from strings representing a plurality of customer identifiers that correspond to the inbound caller.

12. The system of claim 11, wherein the set of instructions further cause the processor to:
    apply approximate string matching analysis to identify the set of n-grams extracted from the strings representing the plurality of customer identifiers.

13. The system of claim 11, wherein the n-gram model comprises a predetermined kmer size or a predetermined step size.

14. The system of claim 8, wherein the set of instructions further cause the processor to:
    analyze records in a lead database to determine whether any of the records in the lead database corresponds to the inbound caller.

15. A system comprising:
- a customer demographic database configured to store demographic data; and
- a server in communication with the customer demographic database, the server configured to:
  - upon receiving a customer call within the call center from an inbound caller, retrieve a customer identifier associated with the inbound caller;
  - query records in the customer demographic database to determine which of the records in the customer demographic database correspond to the customer identifier;
  - execute a predictive machine-learning model configured to determine a value prediction signal representative of value of the inbound caller by applying the predictive machine-learning model to the records retrieved from the customer demographic database;
  - route the customer call to a call queue in accordance with the value prediction signal.

16. The system of claim 15, wherein the value prediction signal corresponds to a likelihood of the inbound caller lapsing.

17. The system of claim 15, wherein the value prediction signal corresponds to a likelihood of the inbound caller accepting an offer.

18. The system of claim 15, wherein the server is further configured to:
- identify the records within the customer demographic database by generating an n-gram corresponding to the customer identifier and applying an n-gram model to extract a set of n-grams from strings representing a plurality of customer identifiers that correspond to the inbound caller.

19. The system of claim 18, wherein the n-gram model comprises a predetermined kmer size or a predetermined step size.

20. The system of claim 15, wherein the server is further configured to:
- analyze records in a lead database to determine whether any of the records in the lead database corresponds to the inbound caller.

* * * * *